US012576868B2

(12) United States Patent
Gowda et al.

(10) Patent No.: US 12,576,868 B2
(45) Date of Patent: Mar. 17, 2026

(54) INCLEMENT WEATHER DETECTION

(71) Applicant: Lytx, Inc., San Diego, CA (US)

(72) Inventors: Sheethal Nagaraja Gowda, Bangalore (IN); Shabbeer Basha Shaik Hussain, Bangalore (IN); Jayachandra Dakala, Bangalore (IN)

(73) Assignee: Lytx, Inc., San Diego, CA (US)

( * ) Notice: Subject to any disclaimer, the term of this patent is extended or adjusted under 35 U.S.C. 154(b) by 61 days.

(21) Appl. No.: 18/084,080

(22) Filed: Dec. 19, 2022

(65) Prior Publication Data

US 2024/0199049 A1 Jun. 20, 2024

(51) Int. Cl.
| | |
|---|---|
| B60W 50/14 | (2020.01) |
| B60W 40/02 | (2006.01) |
| B60W 40/105 | (2012.01) |
| G06V 10/764 | (2022.01) |
| G06V 10/82 | (2022.01) |
| G06V 20/56 | (2022.01) |

(52) U.S. Cl.
CPC ............ B60W 50/14 (2013.01); B60W 40/02 (2013.01); B60W 40/105 (2013.01); G06V 10/764 (2022.01); G06V 10/82 (2022.01); G06V 20/588 (2022.01); B60W 2050/146 (2013.01); B60W 2420/403 (2013.01); B60W 2555/20 (2020.02)

(58) Field of Classification Search
CPC .... B60W 50/14; B60W 40/02; B60W 40/105; B60W 2050/146; B60W 2420/403; B60W 2555/20; B60W 40/06; G06V 10/764; G06V 10/82; G06V 20/588; G06V 20/56
See application file for complete search history.

(56) References Cited

U.S. PATENT DOCUMENTS

| | | | | |
|---|---|---|---|---|
| 11,048,979 | B1 * | 6/2021 | Zhdanov | ............. G06F 18/2155 |
| 2013/0304379 | A1 | 11/2013 | Fulger | |
| 2018/0099646 | A1 * | 4/2018 | Karandikar | ............ G06V 20/56 |
| 2021/0070318 | A1 * | 3/2021 | Cheng | .................... G06V 20/56 |
| 2021/0293573 | A1 * | 9/2021 | Sofman | ............. G01C 21/3469 |
| 2021/0383269 | A1 * | 12/2021 | Zhou | .................... G06N 3/0464 |
| 2022/0083790 | A1 * | 3/2022 | Samona | ................. G06V 20/13 |
| 2023/0077516 | A1 * | 3/2023 | Bianconcini | ........... G06V 20/56 |
| | | | | 382/104 |
| 2025/0136126 | A1 * | 5/2025 | Loghin | ............. B60W 50/0098 |

FOREIGN PATENT DOCUMENTS

| | | |
|---|---|---|
| CN | 111753610 | 10/2020 |

OTHER PUBLICATIONS

Dhananjaya et al. "Weather and light level classification for autonomous driving: Dataset, baseline and active earning." 2021 IEEE International Intelligent Transportation Systems Conference (ITSC). IEEE, 2021.

* cited by examiner

*Primary Examiner* — Brian Wilson
(74) *Attorney, Agent, or Firm* — Van Pelt, Yi & James LLP

(57) ABSTRACT

The present application discloses a method, system, and computer system for detecting inclement weather driving conditions. The method includes obtaining an image captured by a camera mounted to a vehicle, determining a classification for road and weather conditions using a condition prediction model to analyze the image, in response to determining that the classification for road and weather conditions matches a particular predefined road and weather classification, determining an active measure associated with the particular predefined road and weather classification, and causing the active measure to be performed.

25 Claims, 12 Drawing Sheets

200

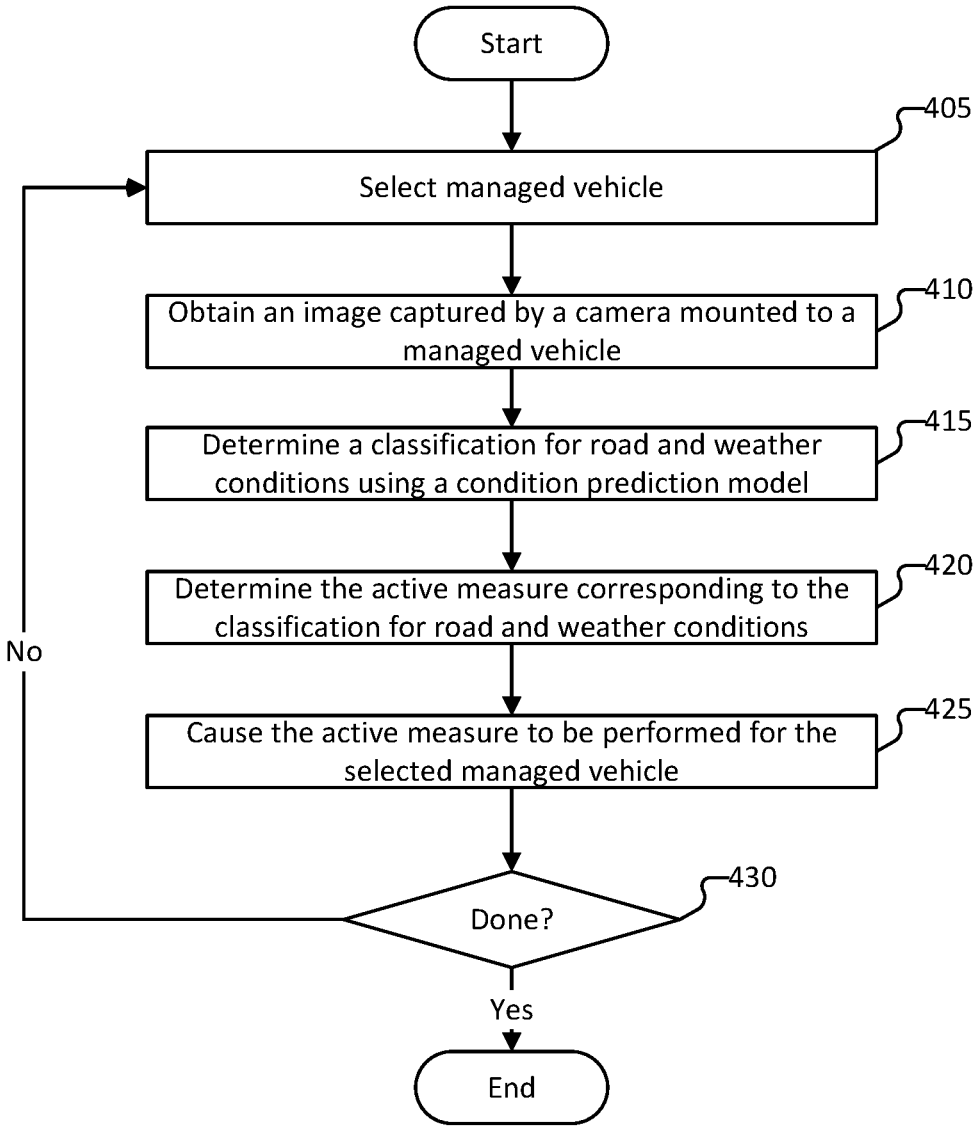

Start

405

Select managed vehicle

410

Obtain an image captured by a camera mounted to a
managed vehicle

415

Determine a classification for road and weather
conditions using a condition prediction model

420

Determine the active measure corresponding to the
classification for road and weather conditions No

425

Cause the active measure to be performed for the
selected managed vehicle

430

Done?

Yes

End

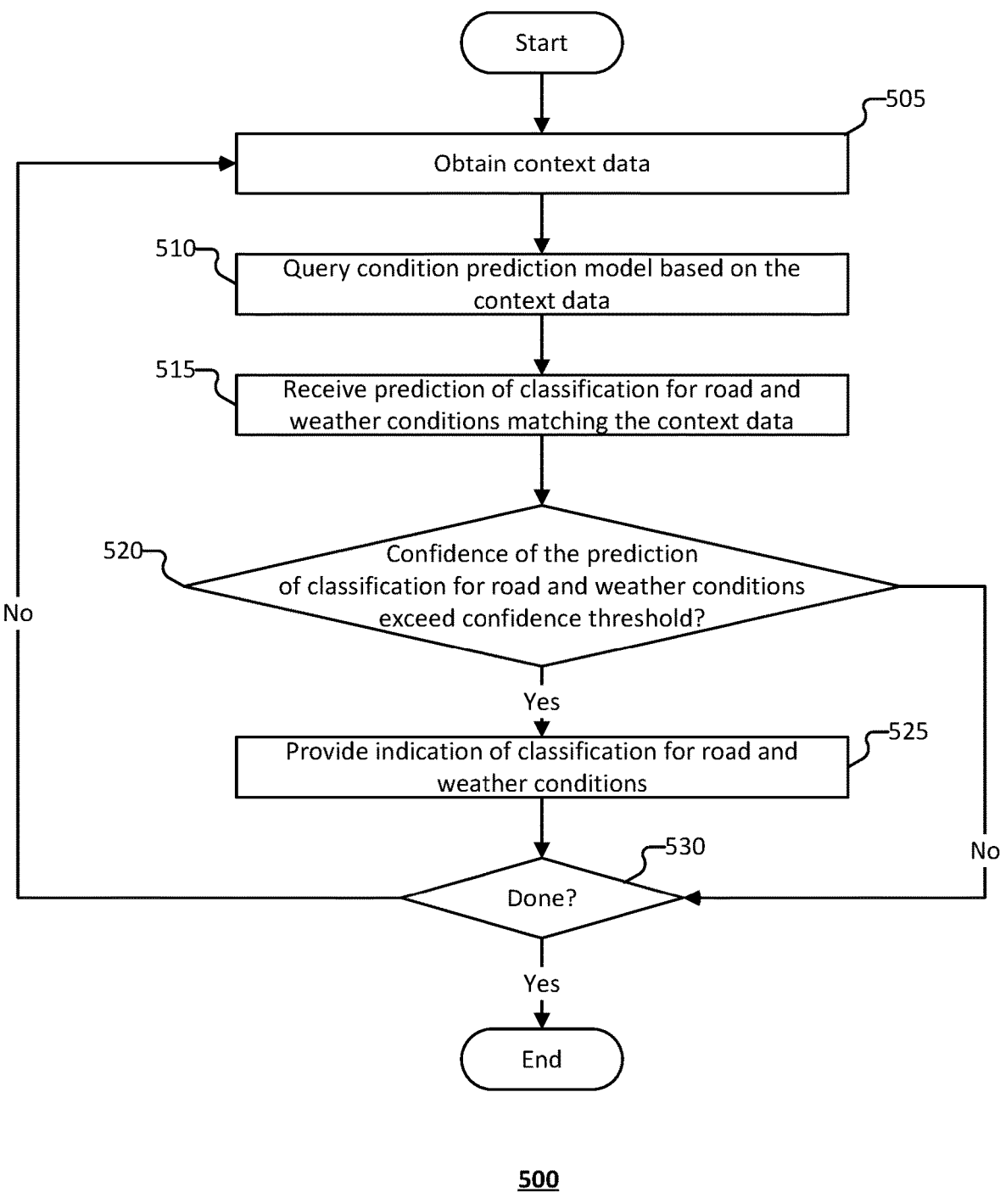

Start

505
Obtain context data

510
Query condition prediction model based on the context data

515
Receive prediction of classification for road and weather conditions matching the context data 520
Confidence of the prediction of classification for road and weather conditions exceed confidence threshold?

No

Yes

525
Provide indication of classification for road and weather conditions

530
Done?

No

Yes

End

Start

Obtain a training set of images   —1105

Analyze the training set of images using a machine learning process to determine a first condition prediction model   —1110

Store the first condition prediction model   —1115

No

Done?   —1120

Yes

End

1100

1200

INCLEMENT WEATHER DETECTION

BACKGROUND OF THE INVENTION

Modern transportation vehicles often include vehicle management services in order to support driver safety, operational safety, and operational productivity. Examples of vehicle management services include receiving routing information, vehicle event recorders, providing alerts to vehicle operators such as to inform vehicle operators of expected high risk events, etc. A vehicle event recorder typically includes a set of sensors (e.g., cameras, video recorders, audio recorders, accelerometers, gyroscopes, vehicle state sensors, global positioning system sensors, etc.) that report data that can be analyzed to determine the occurrence of incidents such as high-risk events, process inefficiencies, driver compliance, or anomalous events (e.g., distractions, hard braking, lane change, pedestrians, rain, accidents, risky maneuvers, unexpected locations, proximity risks, vehicle malfunctions, improper driver behavior, etc.).

BRIEF DESCRIPTION OF THE DRAWINGS

Various embodiments of the invention are disclosed in the following detailed description and the accompanying drawings.

FIG. 4 is a flow diagram of a method for performing an active measure based on a classification for road and weather conditions according to various embodiments of the present application.

FIG. 5 is a flow diagram of a method for predicting a classification for road and weather conditions according to various embodiments of the present application.

DETAILED DESCRIPTION

Figure 1:
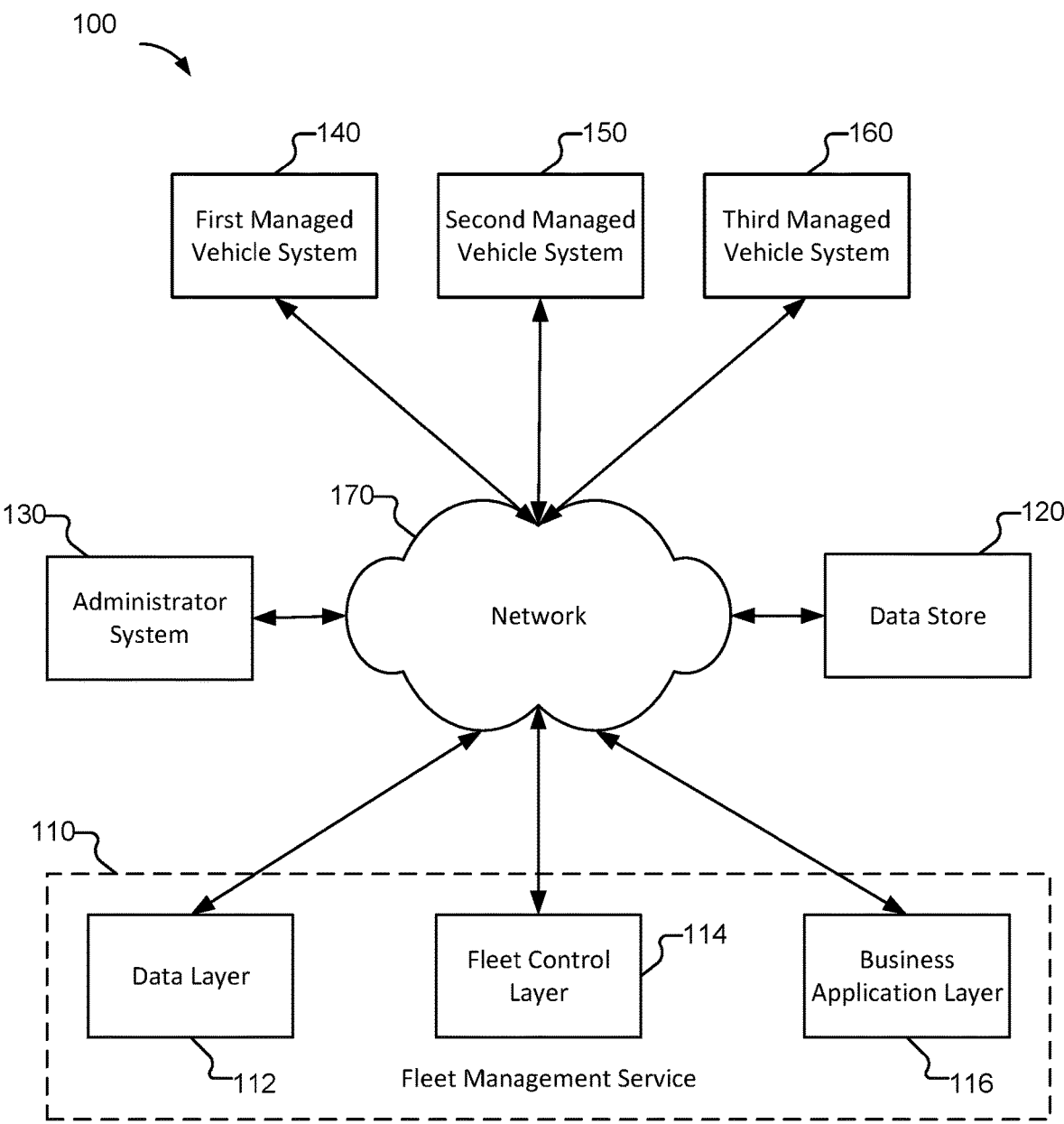
FIG. 1 is a block diagram of a system for managing a fleet of vehicles according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a managed vehicle may include a vehicle that is in communication with a fleet management service. As an example, the managed vehicle may send to the fleet management service status information, context information, route information, etc. As another example, the managed vehicle may receive from the fleet management service various hazard information, routing information, etc. A managed vehicle may be a vehicle that is registered with fleet management service (e.g., to receive a management service such as re-routing, etc.). A managed vehicle may also be referred to herein as a vehicle.

As used herein, context data (e.g., for a managed vehicle) may include vehicle location, speed, direction of travel, a current route, an image captured by the managed vehicle, a status of the payload, an indication of the payload, a destination, driver information, etc.

Fleet managers manage a set of managed vehicles as the managed vehicles are enroute to their respective destinations. Fleet managers may monitor a status of a fleet of managed vehicles. In connection with monitoring the fleet of managed vehicles, the fleet manager may manage a managed vehicle, such as coordinating routing of the managed vehicle. However, the occurrence of inclement weather along a route for a managed vehicle can pose a risk to the safety of the managed vehicle or driver thereof. Accordingly, various embodiments improve the detection of inclement weather along a road or route for the managed vehicle. Further, according to various embodiments, the system causes an active measure to be performed automatically in response to detection of inclement weather along the road or route for the managed vehicle. The active measure can include sending data to a user such as a fleet manager or driver of the managed vehicle. Examples of data that the fleet manager include map data, route data (e.g., a recommended alternative route), an alert pertaining a road and weather condition (e.g., an alert that the route of the managed vehicle is expected to be impacted by inclement weather, an alert to reduce speed, an alert to exercise caution, etc.).

Typically, fleet managers use various pieces of information to manually make decisions for managing vehicles. For example, in related art systems, fleet managers balance various inputs that may impact the route for a vehicle. Fleet managers use various web browser windows to obtain information that may impact a managed vehicle, such as road information, weather information, or traffic information applicable to a location of a managed vehicle or along the planned route for the managed vehicle. This poses a problem because such reliance on obtaining relevant information from separate sources and the manual decision making based on the separate information results in inefficient and error-prone decisions. Further, the reliance on third party sources to provide information relevant to a route(s) for one or more managed vehicles without confirmation that the information is accurate or relevant to decisions for fleet management.

Related art systems are unable to accurately assess driving conditions along a route or on a portion of a road captured by a vehicle camera. For example, related art systems may classify road and weather conditions along a road (or part of a road) based on performing an image analysis. Classifying the road and weather conditions based on an image is prone to error.

One reason for the susceptibility of erroneously classifying the road and weather conditions based on an image is because the road condition and weather condition may be conflicting. For example, along a particular road (e.g., captured in an image being analyzed), the weather condition may be snowy, and the road condition may be clear (e.g., recently plowed, not impacted by significant snow, etc.). For images classified by related art systems, generally 40% to 50% of the image comprises the road and the remainder of the image corresponds to the surrounding environment.

Another reason for the susceptibility of erroneously classifying the road and weather conditions based on an image is that the image analysis according to related art observes significant data similarity across different road and weather conditions. As an example, an image including a wet road and rainy weather can have a high degree of similarity as an image including a wet road and snowy weather. Accordingly, related art systems are generally prone to mis-classifying road and weather conditions in an image for certain conditions having a high degree of similarity.

Accordingly, related art systems lack precise classification of images and, specifically, lack precise classification of road and weather conditions. Related art systems may use conventional machine learning processes to train a model to predict road and weather conditions based on image classifications. However, the images may have a label conflict arising from a high degree of similarity across certain conditions. Thus, the use of machine learning models using related art techniques to predict road and weather conditions may not yield a stable prediction model. For example, the accuracy for related art systems for classifying road and weather conditions based on a machine learning model is about 50 percent (e.g., 50 percent of the images are correctly predicted, and 50 percent of the images are incorrectly predicted).

In addition to related art techniques yielding imprecise classifications of road and weather conditions, related art systems have a significantly large number of images in the dataset that may be used to train the models. However, most of the images in the dataset represent clear driving conditions. Thus, selecting relevant data from such a large dataset is time-consuming and expensive.

Accurate classification (e.g., determination, prediction, etc.) of road and weather conditions is important because the road and weather conditions at a location at which a vehicle is travelling (or is to travel within a short period of time, such as within a predefined time threshold) can create a hazard or increased likelihood of an accident, such as a collision event. If the road and weather conditions include inclement weather and/or non-clear roads (e.g., wet roads, snowy roads, black ice, etc.), the driver may drive differently or avoid the road. Further, avoiding mischaracterization of the road and weather conditions is important to determining remedial measures to be performed, if any.

According to various embodiments, the system implements a machine learning model (e.g., a condition prediction model) to analyze images pertaining to managed vehicle routes and determine whether the route (e.g., road on which the managed vehicle is travelling) is experiencing (or expected to experience) inclement weather. In some embodiments, the machine learning model predicts whether the road captured in the image is experiencing (or expected to experience) inclement weather based on the image and map data or weather data (e.g., weather data included in a map data). The machine learning model may be trained based on an improved selection of training images. The training images may be selected based on implementing an image sampling process. For example, the machine learning model is trained (or updated/retrained) using a training set that is determined by identifying images of one or more classifications of road and weather conditions for which a confidence level of the classification of the image (e.g., by a machine learning model, such as the condition prediction model) exceeds a predefined confidence threshold. If the model is trained using images selected based on the confidence level, the training set is a higher quality set of images that do not have conflicting classifications.

Various embodiments include a system, device, and/or method to train or update a condition prediction model. The method includes (i) obtaining an image, (ii) obtaining geolocation data and time data respectively associated with the image, (iii) using a first condition prediction model to analyze the image and determine a corresponding predicted road and weather conditions, (iv) determining whether a confidence score for the predicted road and weather conditions exceeds a predefined confidence threshold, and (v) in response to determining that the confidence score exceeds the predefined confidence threshold, (a) annotating the image to include an indication that the image matches the predicted road and weather conditions, (b) storing the image in an annotated data set, and (c) using the annotated data set to train a second condition prediction model.

Various embodiments include a system, device, and/or method for predicting road and weather conditions. The method includes (i) obtaining an image captured by a camera mounted to a vehicle, (ii) determining a classification for road and weather conditions using a condition prediction model to analyze the image, and (iii) in response to determining that the classification for road and weather conditions matches a particular predefined road and weather classification, (a) determining an active measure associated with the particular predefined road and weather classification, and (b) causing the active measure to be performed. In some embodiments, the method is implemented by a server that provides a fleet management service to a fleet manager for one or more managed vehicles.

According to various embodiments, the system determines a classification for road and weather conditions for a particular road based at least in part on image data. For example, the system may obtain image data based on one or more images of the area, such as images obtained from a managed vehicle or images obtained from a third-party service (e.g., traffic cameras, etc.).

In some embodiments, the system obtains information pertaining to one or more managed vehicles (e.g., a fleet of managed vehicles). Examples of information that the system obtains include an image captured by a managed vehicle, a geolocation of a managed vehicle (e.g., current global position system (GPS) location data for the managed vehicle), unified map data (e.g., a map that is generated to aggregate different types of information obtained from various sources), weather data, temperature data, traffic data, road closure data, road construction data, parking data or other context data pertaining to the managed vehicle (e.g., an indication of whether the vehicle is parked, an indication of whether the vehicle is in drive mode/gear, a speed of the vehicle, a route for the vehicle, a cargo loaded on the vehicle, etc.). The system may receive the information pertaining to a managed vehicle from the managed vehicle (e.g., the managed vehicle captures an image using a camera mounted on the vehicle, the vehicle reports its GPS location data, etc.), a fleet manager (e.g., an input by the fleet manager, such as definition of a route for the managed vehicle), and/or one or more third party services (e.g., a weather service, a traffic service, a road classification service, etc.).

In response to receiving the information pertaining to one or more managed vehicles, the system uses such information to determine whether the managed vehicle is currently travelling, or expected to travel within a predefined time threshold, on a road (e.g., a part of the road) that is experiencing or expected to experience (e.g., within a predefined detection time threshold) inclement weather, such as a predefined road and weather condition. In some embodiments, the system classifies the road and weather conditions along the road (or the part of the road). As an example, the system classifies the road and weather conditions based on querying a condition prediction model. The condition prediction model may be a machine learning model, such as a machine learning model trained using a training set of images for which a confidence of a certain classification of corresponding road and weather conditions exceeds a predefined confidence threshold. The predefined confidence threshold may be configurable, such as to allow for the sensitivity of the condition prediction model to be adjusted. In some embodiments, the condition prediction model is trained using a deep neural network process. The condition prediction model may predict a classification of road and weather conditions for an image based on image data for the image and other information pertaining to the managed vehicle (e.g., context data, map data such as a unified map, or weather data for a location corresponding to the image).

In some embodiments, the condition prediction model classifies the road and weather conditions corresponding to the road (e.g., the road captured in the image) based on a predefined set of classifications. The predefined set of classifications have N different classifications, where N is a positive integer. In some embodiments, the predefined set of classifications has three different classifications. In some embodiments, the predefined set of classifications has five different classifications. In some embodiments, the predefined set of classifications has nine different classifications. The number of classifications used to classify road and weather conditions may be based on the availability/quality of input data (e.g., training images, weather data, etc.). The thinner the training data is sliced (e.g., the greater number of classifications), the greater the difficulty of making high confidence level predictions. A condition prediction model according to various embodiments is found to have significant improvements in accuracy over related art techniques for classifying an image. An example condition prediction model according to various embodiments was found to have a classification accuracy of about 80 percent. For example, a condition prediction model that classifies the road and weather conditions according to a predefined set of three different classifications has an accuracy of about 80 percent.

Examples of road conditions include clear road, wet road, snowy road (e.g., the road filled with snow or having an extent of snow in excess of snow threshold), icy road (e.g., the road filled with ice or having an extent of ice in excess of ice threshold). Various other road conditions may be implemented.

Examples of weather conditions include clear, rainy, snowy, icy, and foggy. Various other weather conditions may be implemented.

Examples of classifications for a predefined set of classifications having three different classifications include (i) clear or snowy weather and clear road condition, (ii) rainy or snow weather and wet road condition, and (iii) (a) foggy or icy weather conditions and all road conditions, or (b) snowy weather conditions and other road conditions (e.g., icy road condition ice, snowy road condition, etc.).

Examples of classifications for a predefined set of classifications having five different classifications include (i) clear or snowy weather and clear road condition, (ii) rainy or snowy weather and wet road condition, (iii) clear or rainy weather and snowy road condition, (iv) clear or rainy weather and icy road condition, (v) (a) foggy or icy weather condition and all road conditions, or (b) snowy weather and other road conditions (e.g., icy road condition ice, snowy road condition, etc.).

Examples of classifications for a predefined set of classifications having nine different classifications include (i) clear or snowy weather and clear road condition, (ii) rainy or snowy weather and wet road condition, (iii) clear or rainy weather and snowy road condition, (iv) clear or rainy weather and icy road condition, (v) rainy weather and snowy road condition, (vi) rainy weather and icy road condition, (vii) foggy weather and clear road condition, (viii) foggy weather and wet road condition, and (ix) (a) icy or rainy weather and clear road condition, (b) a rainy weather and clear road condition, or (c) icy weather and other road conditions (e.g., icy road condition ice, snowy road condition, etc.).

In some embodiments, the system implements an active measure in response to determining a classification for the road and weather conditions pertaining to a managed vehicle (e.g., a road on which the vehicle is travelling). The system determines the active measure to implement based at least in part on the classification for the road and weather conditions (e.g., a predicted classification). For example, the system stores a mapping of road and weather conditions to active measures, and the system queries the mapping of the road and weather conditions to active measures to determine the active measure matching a predicted classification. Examples of the active measure include alerting a fleet manager (e.g., sending an indication to a user interface of a client system used by the fleet manager), alerting a driver of the managed vehicle (e.g., sending an indication to a user interface of a client system associated with the driver or managed vehicle), determining recommended alternate routes for the managed vehicle, etc.

A system that implements a 3-class classification of road and weather conditions may determine the active measure based on the mapping in Table 1 below. The system sends an indication to the managed vehicle (e.g., the driver) of a speed recommendation.

TABLE 1

| Classification | Speed Recommendation |
| --- | --- |
| clear or snowy weather and clear road condition | 100% of posted speed |
| rainy or snow weather and wet road condition | 75% of posted speed |
| (a) foggy or icy weather conditions and all road conditions, or (b) snowy weather conditions and other road conditions (e.g., icy road condition ice, snowy road condition, etc.) | ~10 MPH |

A system that implements a 5-class classification of road and weather conditions may determine the active measure based on the mapping in Table 2 below. The system sends an indication to the managed vehicle (e.g., the driver) of a speed recommendation.

TABLE 2

| Classification | Speed Recommendation |
| --- | --- |
| clear or snowy weather and clear road condition | 100% of posted speed |
| rainy or snowy weather and wet road condition | 75% of posted speed |
| clear or rainy weather and snowy road condition | 50% of posted speed |
| clear or rainy weather and icy road condition | ~10 MPH |
| (a) foggy or icy weather condition and all road conditions, or (b) snowy weather and other road conditions (e.g., icy road condition ice, snowy road condition, etc.) | ~10 MPH |

A system that implements a 9-class classification of road and weather conditions may determine the active measure based on the mapping in Table 3 below. The system sends an indication to the managed vehicle (e.g., the driver) of a speed recommendation.

TABLE 3

| Classification | Speed Recommendation |
| --- | --- |
| clear or snowy weather and clear road condition | 100% of posted speed |
| rainy or snowy weather and wet road condition | 75% of posted speed |
| clear or rainy weather and snowy road condition | 50% of posted speed |
| clear or rainy weather and icy road condition | ~10 MPH |
| rainy weather and snowy road condition | 50% of posted speed |
| rainy weather and icy road condition | ~10 MPH |
| foggy weather and clear road condition | ~30 MPH |
| foggy weather and wet road condition | ~30 MPH |
| (a) icy or rainy weather and clear road condition, (b) rainy weather and clear road condition, or (c) icy weather and other road conditions (e.g., icy road condition ice, snowy road condition, etc.) | ~10 MPH |

The active measures implemented by the system may be set according to a predefined active measure policy. The active measures may be configurable, such as based on a fleet preference or setting. As an example, the speed recommendations in Tables 1-3 may be configurable by a fleet manager.

In some embodiments, the condition prediction model is a machine learning model. In some embodiments, a machine learning process using a deep neural network is implemented to train the condition prediction model. However, various other machine learning processes may be implemented to obtain the condition prediction model. Examples of machine learning processes that can be implemented in connection with training the condition prediction model include deep neural network, random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, extreme gradient boosting (XGBoost), etc.

As discussed above, related art systems that use a machine learning model to classify images according to road and weather conditions are inaccurate because of labelling conflicts associated with the images or mis-classifying road and weather conditions as a result of a high degree of similarity of image features for certain classifications. According to various embodiments, the condition prediction model is more accurate than related art techniques at least because the system is more selective with respect to training images than related art techniques. Related art techniques generally use a sampling of available images to train the condition prediction model. In some cases, related art techniques sample based on low-confidence score, uncertainty, and/or high training loss. However, according to various embodiments, the system implements an image sampling process to select high-quality images. Examples of high-quality images include images in which the road and weather conditions are highly distinct (e.g., images with a high degree of similarity with respect to at least two different classifications may be excluded), etc.

Annotating a large amount of unlabeled data (e.g., images) is both expensive and time-consuming. Accordingly, an intelligent way of pooling data is expected to minimize the annotation cost and allow for selection of the right set of images for training and building stable models (e.g., condition prediction models).

In some embodiments, the image sampling process includes performing a pre-classification prediction using image data and other context data such as unified map data (e.g., weather data comprised in the unified map). For example, the system determines a location corresponding to the image being pre-classified, and the system obtains unified map data corresponding to that location (e.g., weather data, precipitation data, or temperature data for that location). The use of unified map data (e.g., weather data) in conjunction with the image data in order to classify an image may lead to a greater confidence level with respect to the classification. For example, if the image data has a high degree of similarity to features of a plurality of classifications, the use of the unified map data improves the accuracy of classifying the road and weather condition. If a certain image has a high degree of similarity between a wet road and an icy road, the weather data adds clarity on the proper classification. For example, if the image is taken at a location where the temperature is significantly above 32 degrees F., then the system may deem the road to be wet rather than icy and can improve the accuracy of the classification. Conversely, if the image is taken at a location where the temperature is at or below 32 degrees F., then the system may deem the road to be icy.

According to various embodiments, the image sampling process includes (i) sampling the images based on a set of attributes such as geographic location, time data, weather data (e.g., weather condition forecasted by a weather service for the corresponding time/location), (ii) from the sampled images, select the images based on the model predictions such that images for which classifications have a high confidence (e.g., a confidence level exceeding a predefined confidence threshold or otherwise having a distance in feature space that is less than a predefined feature space distance threshold) are pooled to train the model, (iii) provide the set of selected images for annotation (e.g., annotate the data according to the corresponding classification, such as the classification predicted by the model), and (iv) use the annotated data to train the model (e.g., the machine learning model). In some embodiments, the predefined confidence threshold is set relatively high, such as greater than or equal to 80 percent. Various other confidence thresholds may be implemented. For example, in some implementations, the predefined confidence threshold is set to be greater than 85 percent. As another example, in some implementations, the predefined confidence threshold is set to be greater than 90 percent. As another example, in some implementations, the predefined confidence threshold is set to be greater than 95 percent.

In some embodiments, the trained model(s) are used to evaluate their performance on the test set, and the evaluation results are used as a feedback metric to iterate the training process. As an example, the feedback mechanism for training the model may include using a previous model iteration of the model to analyze images to identify classifications or attributes of images for which the previous model iteration is inaccurate (e.g., has a corresponding accuracy less than a predefined accuracy threshold). As another example, the feedback mechanism for training the model may include using the previous model iteration in connection with selecting a next set of images to be used to train/update the model.

In some embodiments, the system captures various attributes pertaining to the images in the training set. Examples of attributes captured include road visibility, windshield surface, road surface, etc. Various other attributes may be captured. In connection with implementing the feedback mechanism (e.g., further training/re-training the model), the system uses one or more attributes pertaining to the images in the training set to identify those attributes for which the previous model iteration does not classify with sufficient accuracy (e.g., accuracy of classification is less than a predefined attribute classification accuracy threshold). For example, if the system determines that the model is not performing with sufficient accuracy on a test set for which the windshield has droplets, the system determines to further train the model with respect to such attributes. In response to determining that the previous model iteration is not performing with sufficient accuracy with respect to a particular attribute(s), the system determines to collect a greater number or percentage of images with such attribute(s) in the training set used to retrain/update the model. Using the example above, in response to determining that the previous model iteration does not have sufficiently accuracy with respect to classifying images for which the windshield has droplets, the system pools more images for which the windshield has droplets and adds those images to the training set for the next model iteration.

In some embodiments, the system uses a previous model iteration to select images to be included in the training set for the next model iteration. For example, for every iteration after the initial training of the model (e.g., which may be based on manual annotations), the system obtains the previous model iteration and implements the previous model iteration to classify a set of images. The system selects a subset of images (e.g., a subset of the set of images) to use to train the subsequent model iteration based on a confidence level associated with the respective classifications for the set of images. For example, the system implements the pre-classification of the set of images using the previous model iteration and selects those images for which the previous model iteration predicts a classification with a confidence greater than a predefined confidence threshold for training the next iteration of the model. In some embodiments, the predefined confidence threshold used in the pre-classification (e.g., filtering of images to select the images to use to in training/re-training the model) is configurable or is different across iterations. For example, the greater the number of iterations over which the model has been trained, the lower the predefined confidence threshold used to select images for a training set. In the initial iterations, the system pools easy samples (e.g., images for which the confidence level is sufficiently high) that have a high inter-class dissimilarity. For example, in the case of classifying road and weather conditions, the system may classify the images to detect heavy rain weather conditions compared to light rain weather conditions. In other words, differentiating the heavy rain images may be easier for the model than differentiating light rain conditions. After the model is trained (e.g., a more stable model) using easy samples (e.g., samples having a high degree of dissimilarity across classifications), later iterations of training/re-training the model may implement more difficult samples (e.g., samples having a lesser degree of dissimilarity across classifications).

The system selects images for the training set based on implementing a sampling process. The process for training the condition prediction model includes using manual classification to classify/annotate an initial set of images, or to receive an initial set of images that have been pre-classified/annotated (e.g., based on a third-party service). In response to determining the classifications/annotations for the initial set of images, the system may select an initial training set based on one or more attributes and use the initial training set to train a prediction model (e.g., the condition prediction model) to predict images based on the one or more attributes (e.g., to train the condition prediction model to identify images having the attributes, etc.). As an example, the one or more attributes for training the initial training set may be attributes for which the images exhibit a high degree of dissimilarity for images having the attributes as compared to images not having the attributes. As another example, the initial training set is determined based on selecting images that have a high degree of dissimilarity along a particular attribute. In response to training the condition prediction model based on the initial training set of images, the condition prediction model is updated/re-trained based on implementing the image sampling process according to which a set of images for the update/re-training are selected based on a prediction provided by the current condition prediction model.

In some embodiments, the condition prediction model is deployed as a fleet management service, such as using a server that provides a cloud service (e.g., a software as a service) to a fleet manager or drivers of managed vehicles. In some embodiments, the condition prediction model is deployed locally at a managed vehicle system (e.g., a computer of the managed vehicle, a vehicle event recorder, etc.). As an example, local deployment of the condition prediction model at the managed vehicle enables the managed vehicle system to detect driving conditions (e.g., inclement weather or other hazardous driving conditions) without querying the fleet management service.

FIG. 1 is a block a diagram of a system for managing a fleet of vehicles according to various embodiments of the present application. According to various embodiments, system 100 implements at least part of process 300 of FIG. 3, process 400 of FIG. 4, process 500 of FIG. 5, process 600 of FIG. 6, process 700 of FIG. 7, process 800 of FIG. 8, process 900 of FIG. 9, process 1000 of FIG. 10, process 1100 of FIG. 11, and/or process 1200 of FIG. 12.

In the example illustrated in FIG. 1, system 100 includes fleet management service 110, data store 120, administrator system 130, and systems for one or more managed vehicles such as first managed vehicle system 140, second managed vehicle system 150, and/or third managed vehicle system 160. In some embodiments, fleet management service 110 and/or data store 120 are integrated (e.g., combined into a layer or a single set of server(s)). System 100 further includes one or more networks such as network 170 over which administrator system 130 and/or first managed vehicle system 140, second managed vehicle system 150, and/or third managed vehicle system 160 communicates with fleet management service 110 or data store 120. In various embodiments, network 170 includes one or more of a wired network, and/or a wireless network such as a cellular network, a wireless local area network (WLAN), or any other appropriate network. System 100 may include various other systems or devices.

In some embodiments, system 100 further includes one or more data sources such as third-party data sources (e.g., traffic information, weather information) or information provided by government organizations (e.g., road information such as collision rates, speed limits, traffic camera feeds, etc.). Fleet management service 110 obtains information from the one or more data sources in connection with determining and implementing an active measure. For example, fleet management service 110 obtains information from the one or more data sources in connection with generating a map (e.g., a unified map comprising a plurality of layers of different types of data). Fleet management service 110 uses the map vehicle location data to determine whether a managed vehicle is expected to be encounter a driving condition (e.g., to determine whether the vehicle is currently travelling in an area experiencing the driving condition or that the vehicle is expected to travel through the area within a threshold period of time). As an example, fleet management service 110 may poll/query the data source(s) for current information or the data source(s) pushes the information to fleet management service 110 or data store 120 (which in turn may be queried by fleet management service 110).

In some embodiments, fleet management service 110 comprises data layer 112, fleet control layer 114, and business application layer 116. Data layer 112, fleet control layer 114, and/or business application layer 116 can be respectively implemented by one or more servers. In some implementations, data layer 112, fleet control layer 114, and/or business application layer 116 are implemented by a same set of one or more servers. In some embodiments, system 100 comprises a plurality of data layers that respectively process data pertaining to various tenants or customers. For example, each data layer can be instantiated and implemented for a different tenant or customer (e.g., each fleet may have its own corresponding tenant). Fleet management service 110 may implement different instances for different fleets of managed vehicles, etc.

In some embodiments, system 100 uses fleet control layer 114 to perform various functions pertaining to control/ management of a set of managed vehicles (e.g., a fleet). Examples of functions implemented by fleet control layer 114 include generating a unified map, determining and/or implementing an active measure, determining whether the vehicle(s) is stopped, determining whether the vehicle(s) is parked, re-classifying road types, etc.

According to various embodiments, fleet management service 110 performs management of a fleet of vehicles (e.g., a set of managed vehicles) or otherwise provides functionality or information to a fleet manager (e.g., a user associated with the set of managed vehicles) for use in connection with managing the fleet of vehicles. In some embodiments, fleet management service 110 actively monitors the fleet of vehicles to determine if/when a vehicle has stopped, whether the vehicle has parked, and whether a managed vehicle is expected to encounter a driving condition (e.g., to determine whether the vehicle is currently travelling in an area experiencing the driving condition (e.g., inclement weather) or that the vehicle is expected to travel through the area within a threshold period of time), whether an area along a route for a managed vehicle is expected to encounter inclement weather. Fleet management service 110 automatically, or upon request from an administrator such as a fleet manager, determines an active measure in response to detection of inclement weather along the road or route for the managed vehicle. For example, fleet management service 110 periodically (e.g., according to a preset frequency) receives location data for a set of managed vehicles (e.g., first managed vehicle system 140, second managed vehicle system 150, and/or third managed vehicle system 160) and determines for each vehicle in the set of managed vehicles whether the vehicle is expected to experience inclement weather. In response to determining that the vehicle is expected to experience inclement weather, fleet management service 110 performs an active measure (e.g., alerting a fleet manager or a driver of the driving conditions, the road and weather conditions; determining an alternative route that avoids or reduces the exposure of the vehicle to the inclement weather; etc.). As an example, in the case of an active measure corresponding to providing an alert in response to detection that the road and weather conditions are of low visibility, fleet management service 110 generates an alert indicating to the driver or fleet manager that the vehicle is encountering, or expected to encounter, a low visibility area, and the alert may provide a recommendation such as for the managed vehicle to reduce speed.

In some embodiments, fleet management service 110 can receive requests to update data for one or more managed vehicles from administrator system 130 (e.g., used by a fleet manager) and/or systems for one or more managed vehicles such as first managed vehicle system 140, second managed vehicle system 150, and/or third managed vehicle system 160. For example, fleet management service 110 can receive a request to obtain current vehicle location and/or assess whether a managed vehicle(s) is experiencing, or expected to encounter (e.g., within a predefined threshold period of time), inclement weather. In response to receiving the request, fleet management service 110 obtains a current vehicle location for the particular vehicle and uses the condition prediction model to determine whether the particular vehicle is experiencing, or expected to encounter, inclement weather (e.g., based on map data for the area, the current vehicle location, and/or an image associated with the vehicle location or location along the vehicle route). In some embodiments, fleet management service 110 uses a condition prediction model to analyze an image and predict whether the image is indicative of inclement weather. Fleet management service 110 may further determine whether the image is indicative of inclement weather based at least in part on one or more other types of data, such as data obtained from a unified map, etc. For example, the condition prediction model may predict whether the image is indicative of inclement weather based on the conjunction of the image and the one or more other types of data. Examples of such other types of data (e.g., data that is comprised in the unified map data) that may be used in connection with determining whether the image is indicative of inclement weather include geographic location, time data, weather data (e.g., weather condition forecasted by a weather service for the corresponding time/location, such weather data may include temperature data, precipitation data, etc.), traffic data, route data (e.g., a route for managed vehicle(s)), road closure data, road construction data, other context data pertaining to the managed vehicle or the route for the managed vehicle.

In some embodiments, system 100 uses fleet management service 110 to monitor the status of managed vehicles, including monitoring whether the managed vehicles are encountering or expected to encounter inclement weather or other driving condition. Fleet management service 110 determines whether a vehicle is encountering, or expected to encounter, inclement weather based at least in part on unified map data and/or image data (e.g., an image captured at the managed vehicle current location, such as by a camera mounted to, on, or in the managed vehicle—for example, a vehicle event recorder camera). The unified map data may correspond to a unified map that fleet management service 110 generates based on a plurality of source data, such as map and road data, weather data (e.g., precipitation data, wind data, etc.), temperature data, traffic data, road closure data, road construction data, etc. The source data may be stored in data store 120 among one or more datasets or may be received via third party data sources/services such as in the form of a data stream (e.g., a weather service, a traffic service, etc.). In some embodiments, fleet management service 110 queries the one or more third party data sources/ services for the source data in connection with generating/ updating the map data, such as a unified map (e.g., in response to determining that a unified map is to be generated or updated, or in response to determining that an inclement weather assessment is to be performed for one or more managed vehicles). In some embodiments, fleet management service 110 periodically queries, or receives from, the one or more third party data sources/services for the source data. As an example, administrator system 130, first managed vehicle system 140, second managed vehicle system 150, and/or third managed vehicle system 160, and/or third-party data sources/services are connected to fleet management service 110 via a connector, such as an application programming interface (API). Fleet management service 110 periodically queries, or receives from, the managed vehicle(s) or other data source for an image corresponding to a current location of the managed vehicle (e.g., a geographic location at which the image is captured is within a predefined distance threshold of the managed vehicle). For example, fleet management service 110 queries a managed vehicle to capture an image using a camera mounted to the managed vehicle.

In some embodiments, fleet management service 110 updates the map data (e.g., the unified map) according to a predefined frequency/time interval. The predefined frequency may be configured to ensure that the unified map comprises accurate information that is relevant when determining whether a vehicle is encountering or expected to encounter inclement weather. For example, the vehicle location data is obtained every 15 seconds, 30 seconds, 60 seconds, etc. and the fleet management service 110 updates the unified map with the vehicle location. As another example, the vehicle location data is obtained every 5 minutes, 10 minutes, 15 minutes, etc. In some embodiments, the unified map is presented to a user, for example, to allow fleet managers to have visibility of the fleet and the status of one or more of the managed vehicles in the fleet. The unified map may include recommended active measures such as emphatic display of recommended alternative routes, a list of pre-configured alerts to be communicated to the managed vehicle(s), etc. In some embodiments, fleet management service 110 provides a unified map, information pertaining to the unified map (e.g., a set of indicators comprised in the unified map), information pertaining to an active measure (e.g., a list of potential/recommended active measures) or an instruction to implement an active measure (e.g., an update to a managed vehicle route), such as in response to data requests. For example, the data requests can be communicated to fleet management service 110 by a client system (e.g., managed vehicle system 140). In some embodiments, fleet management service 110 receives a data request from administrator system 130 in connection with a fleet manager using fleet management service 110 to manage a fleet, to monitor a status of the fleet, to ensure that vehicles in the fleet are safely routed, etc.

In response to receiving a request for a unified map (e.g., a newly generated unified map, an update to a unified map, etc.) or to perform a monitoring/assessment of whether a vehicle is safely routed (e.g., whether the vehicle is encountering, or expected to encounter, inclement weather), fleet management service 110 obtains the applicable source data from data store 120, a managed vehicle (e.g., first managed vehicle system 140, second managed vehicle system 150, and/or third managed vehicle system 160), and/or third party service(s)/system(s) and generates/update the unified map. As an example, the request for the unified map may include, or be associated with, a particular geographic area. As another example, the geographic area is determined based on the one or more managed vehicles for which the unified map is to be generated/updated or that are to be managed or monitored to ensure safe routing. Fleet management service 110 uses the geographic area to obtain the applicable/ relevant source data. For example, fleet management service 110 obtains weather data for the geographic area, traffic data for roads within the geographic area or roads corresponding to a predefined route for a managed vehicle(s), map and road data (e.g., road classifications, road dimensions, number of lanes, posted speed limit, etc.), etc. Fleet management service 110 analyzes the source data to determine locations of a set of managed vehicles, determine whether the managed vehicle(s) are travelling or stopped, determine whether the managed vehicle(s) are safely routed, and determine whether a managed vehicle is encountering, or expected to encounter (e.g., within a threshold period of time), inclement weather. Fleet management service 110 may generate a unified map in connection with monitoring a fleet or determining whether a managed vehicle is encountering, or expected to encounter (e.g., within a threshold period of time), inclement weather, or otherwise safely routed. In response to receiving the source data, fleet management service 110 generates the unified map, including generating one or more layers for the unified map. For example, fleet management service 110 annotates a standard geographic/ road map with information pertaining to one or more of identified driving conditions, parking conditions or other conditions that may impact a vehicle (e.g., a flood warning, a flood zone, construction, snowy conditions, high levels of precipitation, etc.), etc. The annotating the standard geographic/road map includes generating indicators for the driving conditions or various other conditions or information and configuring one or more layers to include such indicators. The one or more layers for the unified map may be toggled on/off and when toggled on (e.g., to be displayed), the one or more layers are provided as an overlay to the standard geographic/road map. In some embodiments, the standard geographic/road map is predefined (e.g., stored in data store 120) or a service provider for the geographic standard geographic/road map is predefined.

Fleet management service 110 uses data layer 112 to obtain the source data to be used in connection with generating/updating a unified map or implementing an active measure. In response to fleet management service 110 determining to generate/update the unified map (e.g., in response to receiving a request from a fleet manager via fleet control layer 114), fleet management service instructs/causes data layer 112 to obtain the applicable source data. Data layer 112 can obtain the applicable source data by querying data store 120, a third-party service/data source, and/or a managed vehicle (e.g., first managed vehicle system 140, second managed vehicle system 150, and/or third managed vehicle system 160). Fleet management service 110 also uses data layer 112 to generate the unified map, such as based on parameters provided by fleet control layer 114 (e.g., parameters that are predefined for a fleet or user or that are received from a fleet manager such as via administrator system 130).

The unified map comprises various different types of data, such as performance data, local data, and third-party data. The unified map presents the various types of data (e.g., collectively referred to herein as unified map data) in a format that enables fleet managers or drivers of managed vehicles to have integrated information of the fleet and the context of the fleet (e.g., driving conditions or other potential impacts to the fleet safety, etc.). The unified map enables fleet managers to identify dangerous areas (e.g., based on emphatic display of hazardous areas), dangerous context for vehicles (e.g., vehicles routed through an area with expected inclement weather), and to perform global fleet routing/management in a manner that avoids the dangerous areas or conditions (e.g., inclement weather), or mitigates the risk associated with the dangerous areas. Further, an association of current images (or ability to retrieve images in real-time from a managed vehicle in a particular area) allows a fleet manager or driver to quickly view and assess the road conditions for a particular road (e.g., to obtain real-time driving conditions), such as a road along which a managed vehicle is parked. For example, an area of the map may be subject to snowstorm conditions according to weather data, but a current image of the area may show that the driving conditions are not hazardous (e.g., the roads may be plowed, or the snowstorm may not have impacted the particular area). The unified map improves on interfaces implemented by related art systems in which fleet managers use distinct interfaces (e.g., browser windows) for the different types of information. Under related art systems, fleet managers struggle with assembling the entire context of the fleet to make informed decisions on routing and fleet safety. The unified map comprises a plurality of layers that can be toggled on/off to enable the system or fleet managers to make quick assessments of whether a managed vehicle is experiencing, or is expected to experience, a driving condition (e.g., a hazardous driving condition), and whether to perform an active measure.

Fleet management service 110 uses fleet control layer 114 to obtain/communicate information, instructions, or requests from/to a fleet manager or managed vehicle, such as via administrator system 130 or first managed vehicle system 140, second managed vehicle system 150, and/or third managed vehicle system 160. For example, fleet control layer 114 configures a user interface based on the unified map (e.g., generated/updated by data layer 112), or other information pertaining to inclement weather assessments (e.g., determinations of whether a managed vehicle is safely routed), and fleet control layer 114 provides the user interface to the fleet manager or a managed vehicle. Fleet control layer 114 can receive from a user a request for a unified map, information pertaining to a fleet, an inclement weather assessment, or an active measure (e.g., a recommended active measure in response to detection of inclement weather that may impact the vehicle). In response to receiving the request for the unified map, fleet control layer 114 causes the unified map to be generated/updated. Further, fleet control layer 114 may cause the unified map to be generated/updated in response to receiving a request for fleet management service 110 to perform an inclement weather assessment. In response to obtaining the unified map, fleet control layer 114 configures the user interface based on the unified map, such as to include the unified map (or a part thereof) or information obtained from the unified map (e.g., indicators of driving conditions, route information, etc.). Fleet control layer 114 then provides the user interface (e.g., the unified map or information pertaining to the unified map) to a user. The user can interact with the user interface, such as to toggle information/layers of the unified map on/off, to select selectable elements provided on the user interface, to select an indicator corresponding to a particular managed vehicle for further information or active measures, etc. As an example, the user uses the user interface to select an active measure (e.g., from among a set of recommended active measures), to accept an active measure (e.g., to confirm a recommended alternate route or request generation of an alternate route), to toggle the granularity of information pertaining to a driving condition or parking condition that is provided on the user interface, etc.

In some embodiments, fleet management service 110 uses fleet control layer 114 to respond to queries for data with respect to a particular managed vehicle or in connection with controlling the processing of various data requests such as generating a unified map, determining whether a vehicle is parked, determining whether a vehicle is within an area experiencing inclement weather, determining whether a vehicle is expected to encounter inclement weather (e.g., along the route for the vehicle), recommending active measures, implementing active measures, etc. As an example, administrator system 130, first managed vehicle system 140, second managed vehicle system 150, and/or third managed vehicle system 160 use an API to connect to fleet management service 110 and configure one or more settings for obtaining vehicle information (e.g., vehicle status, route, driver, vehicle size, vehicle shape, vehicle type/class, corresponding geographic area, unified map, a frequency according to which a vehicle is to provide its current location, etc.). Fleet control layer 114 receives the configurations, queries, etc. from the API, queries data store 120 for data responsive to the query or requests data layer 112 to perform a fleet management control (e.g., generate/update a unified map, generate recommended active measures, retrieving a current image captured by a vehicle deemed to be parked, determine whether a vehicle is experiencing, or expected to encounter, inclement weather, etc.), and provides the data to the system or service requesting the data.

According to various embodiments, system 100 comprises data store 120. System 100 uses data store 120 to store one or more datasets comprising data pertaining to a fleet of managed vehicles (e.g., location data, route information, vehicle information, map information, current images, etc.). In some embodiments, data store 120 stores one or more datasets comprising data pertaining to fleet or vehicle configurations, such as routing preferences and/or predefined restricted routes (e.g., roads, roads having certain characteristics, or roads along which the vehicle is not to travel, etc.). Data store 120 may further store one or more datasets comprising data pertaining to map and road data, such as road identifier, posted speed limit, historical average speed limit (either generally or at a predefined time of day/week), flood zone information, construction zone information, road classification (e.g., interstate, state highway, rural road, etc.), road dimensions, an indicator of whether the road is paved, number of lanes, width of the road, geo-coordinates for the road (e.g., the boundaries, center line, etc.), etc.

In some embodiments, data store 120 or data layer 112 stores a condition prediction model(s). As an example, the condition prediction model is a machine learning model, such as a machine learning model trained using a training set of images for which a confidence of a certain classification of corresponding road and weather conditions exceeds a predefined training set confidence threshold. The predefined training set confidence threshold may be configurable, such as to allow for the sensitivity of the condition prediction model to be adjusted (e.g., by a fleet manager using administrator system 130). In some embodiments, the condition prediction model is trained using a deep neural network process. The condition prediction model is trained to predict a classification of one or more weather or driving conditions exhibited by an image.

In some embodiments, the condition prediction model predicts a classification of road and weather conditions for an image based on image data for the image and other information pertaining to the managed vehicle (e.g., context data, map data such as a unified map, or weather data for a location corresponding to the image). As an example, the condition prediction model classifies the road and weather conditions corresponding to the road (e.g., the road captured in the image) based on a predefined set of classifications. The predefined set of classifications have N different classifications, where N is a positive integer.

In response to receiving the information pertaining to one or more managed vehicles, fleet management service 110 uses such information to determine whether the managed vehicle is currently travelling, or expected to travel within a predefined time threshold, on a road (e.g., a part of the road) that is experiencing or expected to experience (e.g., within a predefined detection time threshold) inclement weather, such as a predefined road and weather condition (e.g., snowy roads, icy roads, poor visibility, etc.). In some embodiments, the system classifies the road and weather conditions along the road (or the part of the road). As an example, fleet management service 110 classifies the road and weather conditions based on querying the condition prediction model.

Fleet management service 110 trains the condition prediction model based at least in part on performing an image sampling process. Image sampling process is used to select images with which to train/update/re-train the condition prediction model. For example, fleet management service 110 uses the image sampling process to select images for which a confidence (e.g., confidence score/level) for predicted classification exceeds a predefined confidence threshold. In some embodiments, the image sampling process includes performing a pre-classification prediction using image data and other context data such as unified map data (e.g., weather data comprised in the unified map). For example, fleet management service 110 determines a location corresponding to the image being pre-classified, and the system obtains unified map data corresponding to that location (e.g., weather data, precipitation data, or temperature data for that location). The use of unified map data (e.g., weather data) in conjunction with the image data in order to classify an image may lead to a greater confidence level with respect to the classification. In response to determining that the confidence for a predicted classification of an image satisfies the predefined criteria (e.g., is greater than the predefined confidence threshold), fleet management service 110 annotates the image with the predicted classification. The image is thereafter used in training/re-training the condition prediction model.

In some embodiments, fleet management service 110 uses a previous model iteration to select images to be included in the training set for the next model iteration. For example, for every iteration after the initial training of the model (e.g., which may be based on manual annotations or annotations provided by another system/service), fleet management service 110 obtains the previous model iteration and implements the previous model iteration to classify a set of images. Fleet management service 110 selects a subset of images (e.g., a subset of the set of images) to use to train the subsequent model iteration based on a confidence level associated with the respective classifications for the set of images. For example, fleet management service 110 implements the pre-classification of the set of images using the previous model iteration and selects those images for which the previous model iteration predicts a classification with a confidence greater than a predefined confidence threshold for training the next iteration of the model. In some embodiments, the predefined confidence threshold used in the pre-classification (e.g., filtering of images to select the images to use to in training/re-training the model) is configurable or is different across iterations. For example, the greater the number of iterations over which the model has been trained, the lower the predefined confidence threshold used to select images for a training set. In the initial iterations, fleet management service 110 pools easy samples (e.g., images for which the confidence level is sufficiently high) that have a high inter-class dissimilarity. For example, in the case of classifying road and weather conditions, fleet management service 110 may classify the images to detect heavy rain weather conditions compared to light rain weather conditions. In other words, differentiating the heavy rain images may be easier for the model than differentiating light rain conditions. After the model is trained (e.g., a more stable model) using easy samples (e.g., samples having a high degree of dissimilarity across classifications), later iterations of training/re-training the model may implement more difficult samples (e.g., samples having a lesser degree of dissimilarity across classifications).

Data store 120 can store datasets for a plurality of tenants or customers serviced by fleet management service 110. In some embodiments, fleet management service 110 uses datasets across tenants or customers. For example, fleet management service 110 queries/retrieves current images from managed vehicles across a plurality of tenants/customers to obtain a current image with respect to a particular location or driving condition. In response to detecting a driving condition (e.g., inclement weather or other hazard that may impact a vehicle, such as a vehicle traveling along a predefined route), fleet management service 110 may determine that a first managed vehicle of a first fleet (e.g., a first customer) is expected to be impacted by the driving condition (e.g., the current vehicle location is in a flood zone and current weather data comprises an amount of precipitation that exceeds a predefined precipitation threshold or a flash flood warning). As an example, fleet management service 110 queries current images pertaining to a location (e.g., within a predefined distance) of the driving location that are captured by the managed vehicles of the first fleet (e.g., fleet management service 110 may query the first managed vehicle to capture a current image using a camera coupled to the vehicle), and fleet management service 110 performs an inclement weather assessment with respect to the current images (e.g., fleet management service determines a road and weather classification for the road corresponding to the image). The inclement weather assessment may include using the condition prediction model to predict a classification of driving/weather conditions (e.g., a road and weather classification) associated with an image based at least in part on the image (e.g., analyzing the image) and unified map data, such as weather data. In response to determining that the current images captured by the managed vehicles of the first fleet do not include the location of the driving condition (e.g., within a predefined time threshold), fleet management service 110 may determine that a second managed vehicle of a second fleet is within the location for the driving condition, and fleet management service 110 sends a request for the second managed vehicle to capture a current image and to send the current image to fleet management service 110. Fleet management service 110 then uses the current image in connection with performing an inclement weather assessment or driving condition assessment, determining an active measure, and/or providing a recommended route for the first managed vehicle, etc.

According to various embodiments, system 100 comprises administrator system 130 for use by an administrator such as an administrator of fleet management service 110 or an administrator or a user associated with data store 120 and/or an instance of fleet management service 110, such as a fleet manager. For example, administrator system 130 comprises a system for communication, data access, computation, etc. A user uses administrator system 130 to maintain a dataset stored in data store 120, to define and manage applications provided by system 100, to set data management policies, to set routing policies, to set active measure policies, to set current image policies (e.g., retention policies, permissions, etc.), to configure the machine learning model or machine learning process used to train/update the condition prediction model, to provide various system configurations or settings, etc. For example, a user uses administrator system 130 to define one or more security policies that are to be enforced (e.g., by fleet management service 110, data layer 112, and/or fleet control layer 114) with respect to a data stored at data store 120. In some embodiments, administrator system 130 communicates with fleet management service 110 via a web-interface (e.g., by using a web browser, etc.). For example, administrator system 130 communicates with fleet management service 110 via a web-browser installed on administrator system 130 (e.g., via a user interface configured by an application running on fleet management service 110). In some embodiments, administrator system 130 communicates with fleet management service 110 via an application or service running on administrator system 130 (e.g., a connector or API corresponding to fleet management service 110).

According to various embodiments, fleet management service 110 comprises business application layer 116. Fleet management service 110 uses business application layer 116 to provide an interface via which a user (e.g., using administrator system 130, etc.) may interact with various applications such as a development application for developing a feature or model for analyzing the data stored in the data store 120 (e.g., a feature/model for detecting driving conditions, a feature/model for classifying driving conditions, a feature/model for generating a unified map, a feature/model for determining active measures, a feature/model for routing vehicles, a feature/model for detecting road and weather conditions, etc.), an application for querying a dataset stored in data store 120, an application for analyzing/manipulating a data entity (e.g., an image, map data, vehicle data, the dataset, etc.), an application to access files stored in a dataset (e.g., a dataset stored in data store 120), etc. Various other applications can be provided by business application layer 116. For example, a user queries data layer 112 by sending a query/request to business application layer 116, which interfaces with data layer 112 to obtain information responsive to the query (e.g., business application layer 116 formats the query according to the applicable syntax and sends the formatted query to data layer 112). Business application layer 116 may query fleet control layer 114, which in turn queries data layer 112. As another example, a user uses an interface provided/configured by business application layer 116 to configure (e.g., define) one or more security policies, including configuring access permissions to files, data entities, and/or one or more data management policies.

According to various embodiments, system 100 comprises one or more managed vehicles. The managed vehicles communicate with system (e.g., fleet management service 110) via a managed vehicle system (e.g., first managed vehicle system 140, second managed vehicle system 150, and/or third managed vehicle system 160). The managed vehicles may correspond to a single fleet (e.g., a single tenant/customer), or may correspond to a plurality of fleets. The managed vehicle system is used by a user such as a driver of a managed vehicle to communicate with fleet management service 110 (e.g., business application layer 116) and/or data stored in data store 120. For example, the managed vehicle system obtains from fleet management service 110 route information, map and road data, a unified map, alerts of driving or parking conditions, traffic information, weather information, etc. As an example, the managed vehicle system communicates with fleet management service 110 via a web-interface. In some embodiments, the managed vehicle system communicates with fleet management service 110 via an application or service running on a managed vehicle system (e.g., a module such as a connector or API that interfaces with fleet management service 110).

Figure 2:
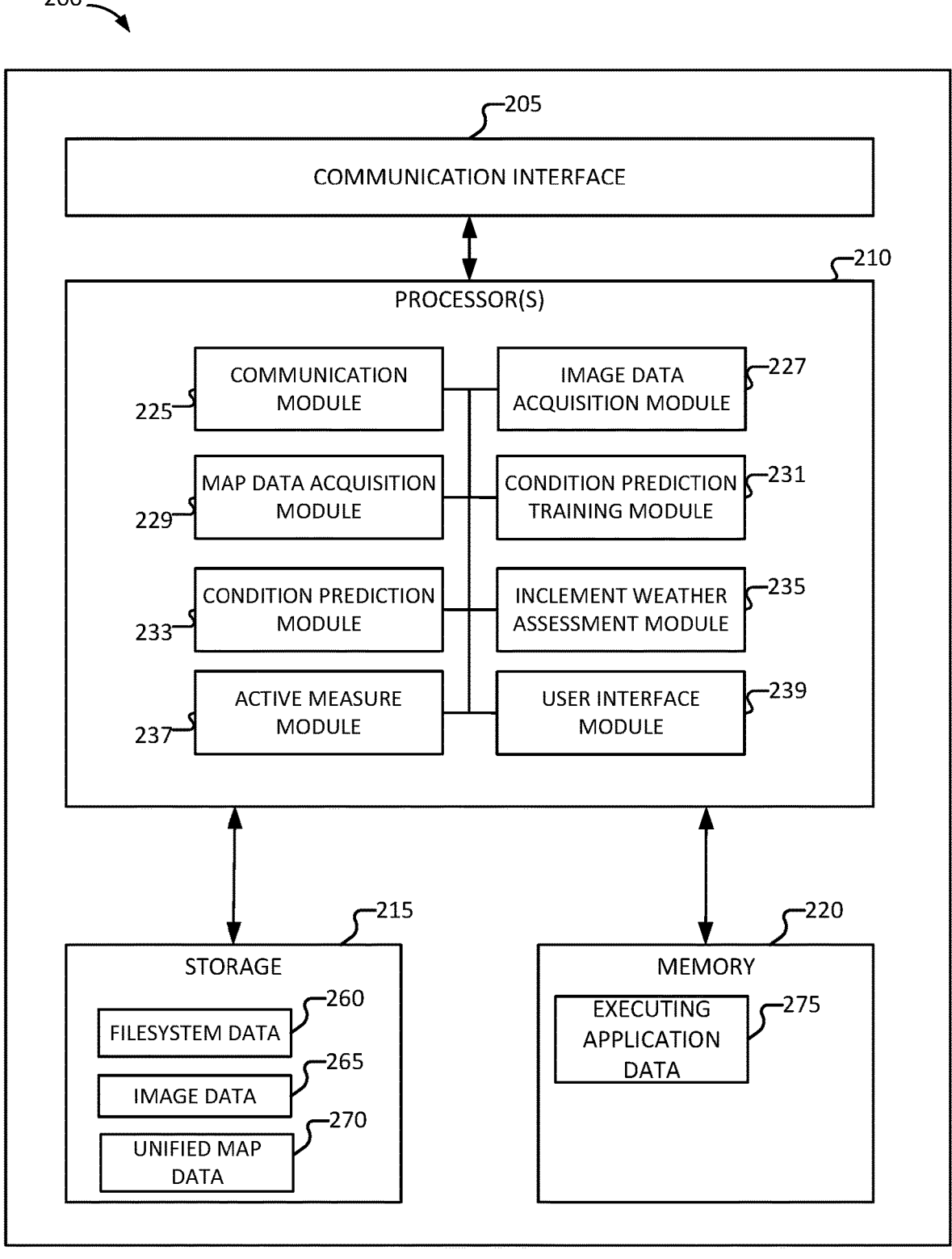
FIG. 2 is a block diagram of a fleet management service for managing vehicles according to various embodiments of the present application.

FIG. 2 is a block diagram of a fleet management service for managing vehicles according to various embodiments of the present application. According to various embodiments, system 200 implements at least part of process 300 of FIG. 3, process 400 of FIG. 4, process 500 of FIG. 5, process 600 of FIG. 6, process 700 of FIG. 7, process 800 of FIG. 8, process 900 of FIG. 9, process 1000 of FIG. 10, process 1100 of FIG. 11, and/or process 1200 of FIG. 12.

In the example shown, system 200 implements one or more modules in connection with managing a fleet of managed vehicles, classifying images, determining predicted road and weather conditions, generating a unified map, determining to implement an active measure with respect to a managed vehicle, classifying parking conditions (e.g., criteria according to which a parking condition is identified, such as a blizzard warning in or around a blizzard, etc.), recommending or implementing an active measure for a managed vehicle, etc. System 200 comprises communication interface 205, one or more processors 210, storage 215, and/or memory 220. One or more processors 210 comprises, or implements, one or more of communication module 225, image data acquisition module 227, map data acquisition module 229, condition prediction training module 231, condition prediction module 233, inclement weather assessment module 235, active measure module 237, and/or user interface module 239.

In some embodiments, system 200 comprises communication module 225. System 200 uses communication module 225 to communicate with various other systems such as a user system, an administrator system, a managed vehicle system, a data source (e.g., from which files comprising information to be ingested are received, such as a weather service, a traffic service, road data, etc.), and/or a data store (e.g., a distributed data storage system). For example, communication module 225 provides to communication interface 205 information that is to be communicated. As another example, communication interface 205 provides to communication module 225 information received by system 200. Communication module 225 is configured to receive user input to a user system such as a data access request, a request for a unified map, a request for map data (e.g., traffic data, weather data, hazard data, etc.), a request for system 200 to perform an inclement weather assessment (e.g., to classify an image/data corresponding to a location for a managed vehicle), a request for recommended active measures (e.g., alternative parking locations), a request for routing information (e.g., an updated route based on detected driving conditions), a security policy, an access policy, a fleet management policy, a routing policy, an active measure policy, a driving condition classification policy, a storage system configuration such as a configuration for a partitioning of data, a selection of an active measure, etc. The user input to the user system can include a query for a file (e.g., a csv file, a library, a module, etc.), a query for a data (e.g., a unified map, traffic data, weather data, hazard data, etc.), a request to set one or more security policies (e.g., a permission with respect to accessing a file), etc. Communication module 225 is configured to provide various user systems or data requesting services with information such as a user interface (e.g., an interface corresponding to a managed vehicle dashboard, a unified map, driving condition information), information that is responsive to one or more queries or tasks requested to be executed, credentials for accessing data, etc. In some embodiments, communication module 225 communicates data responsive to data requests (e.g., unified map, routing information, current images, etc.).

In some embodiments, system 200 comprises image data acquisition module 227. System 200 uses image data acquisition module 227 to obtain image(s) corresponding to a vehicle. As an example, an image corresponding to a vehicle includes an image captured by the vehicle (e.g., captured in real-time), an image having a location within a predefined distance threshold of a current location of the vehicle and within a predefined period of time. The image is captured by the vehicle (e.g., the managed vehicle for which an inclement weather assessment is to be performed), an image captured by another vehicle in a fleet or other fleet (e.g., in the case that data is permitted to be shared across fleets, tenants, customers, etc.), an image obtained by a third party service, such as a traffic service, video/image feeds from traffic cameras associated with a department of transportation or other government entity, etc. Image data acquisition module 227 communicates with one or more data sources to obtain images. The one or more data sources may be the particular managed vehicle (e.g., querying the vehicle for a current location) and/or third-party services, such as services with which system 200 is registered, etc. In some embodiments, image data acquisition module 227 receives streams of information from the one or more data sources (e.g., streams of traffic camera data). For example, the one or more data services pushes information, such as images, to system 200. In some embodiments, image data acquisition module 227 queries the one or more data sources, such as in accordance with a predetermined schedule or frequency, in response to requests for inclement weather assessments, unified maps, recommendations for active measures, or routing information, etc. As an example, the predetermined schedule or frequency is set according to a driving information policy set by an administrator/fleet manager, etc.

In some embodiments, system 200 comprises map data acquisition module 229. System 200 uses map data acquisition module 229 to obtain information pertaining to a geographic area and generate a unified map or unified map data based on such information. Examples of information pertaining to the geographic area include one or more of geolocation data of a managed vehicle, map data, road data (e.g., road classification, posted speed limit, number of lanes, road width, etc.), weather data, temperature data, traffic data, road closure data, road construction data, parking data or other context data pertaining to a managed vehicle within the geographic area (e.g., an indication of whether the vehicle is parked, an indication of whether the vehicle is in drive mode/gear, a speed of the vehicle, a route for the vehicle, a cargo loaded on the vehicle, etc.). The geographic area may be a predefined geographic area (e.g., an area including all originating locations and destination locations for one or more managed vehicles, such as vehicles selected by a fleet manager), or a geographic area determined based on a selection by a user such as a fleet manager or managed vehicle driver. Map data acquisition module 229 may receive map data or other information pertaining to a managed vehicle from the managed vehicle (e.g., the managed vehicle captures an image using a camera mounted on the vehicle, the vehicle reports its GPS location data, etc.), a fleet manager (e.g., an input by the fleet manager, such as definition of a route for the managed vehicle), and/or one or more third party services (e.g., a weather service, a traffic service, a road classification service, etc.). Map data acquisition module 229 communicates with one or more data sources to obtain images. The one or more data sources may be the particular managed vehicle (e.g., querying the vehicle for a current location) and/or third-party services, such as services with which system 200 is registered, etc. In some embodiments, map data acquisition module 229 receives streams of information from the one or more data sources (e.g., streams of weather data, traffic data, road construction data, etc.). For example, the one or more data services pushes information, such as weather data or traffic images, to system 200. In some embodiments, map data acquisition module 229 queries the one or more data sources, such as in accordance with a predetermined schedule or frequency, in response to requests for inclement weather assessments, unified maps, recommendations for active measures, or routing information, etc. As an example, the predetermined schedule or frequency is set according to a driving information policy set by an administrator/fleet manager, etc.

System 200 uses map data acquisition module 229 to generate a unified map based at least in part on information pertaining to a geographic area. Map data acquisition module 229 generates the unified map/unified map data based at least in part on information pertaining to a geographic area or managed vehicle. Generating the unified map includes generating a plurality of layers for the unified map. The plurality of layers may respectively include one or more annotations for a map at a particular location. For example, map data acquisition module 229 annotates a standard geographic/road map with information pertaining to one or more of identified driving conditions, conditions that may impact a vehicle (e.g., a flood warning, a flood zone, construction, snowy conditions, high levels of precipitation, etc.), etc. For example, in the case of a layer for weather data, map data acquisition module 229 annotates the map to include an indicator for a particular weather condition occurring within the geographic area corresponding to the unified map. Examples of annotations on the layer for weather data include an indicator for high winds, an indicator of heavy precipitation, an indicator of severe weather, an indicator of weather being below freezing, etc. The one or more layers for the unified map may be toggled on/off and when toggled on (e.g., to be displayed). For example, the one or more layers are provided as an overlay to the standard geographic/road map. In some embodiments, the standard geographic/road map is predefined or a service provider for the geographic standard geographic/road map is predefined.

The unified map comprises various different types of data, such as performance data, local data, and third-party data. The unified map presents the various types of data (e.g., collectively referred to herein as unified map data) in a format that enables fleet managers or drivers of managed vehicles to have integrated information of the fleet and the context of the fleet (e.g., driving conditions or other potential impacts to the fleet safety, etc.). The unified map enables fleet managers to identify dangerous areas (e.g., based on emphatic display of hazardous areas), dangerous context for vehicles (e.g., vehicles routed through an area with expected inclement weather), and to perform global fleet routing/management in a manner that avoids the dangerous areas or conditions (e.g., inclement weather), or mitigates the risk associated with the dangerous areas. Further, an association of current images (or ability to retrieve images in real-time from a managed vehicle in a particular area) allows a fleet manager or driver to quickly view and assess the road conditions for a particular road (e.g., to obtain real-time driving conditions), such as a road along which a managed vehicle is parked. For example, an area of the map may be subject to snowstorm conditions according to weather data, but a current image of the area may show that the driving conditions are not hazardous (e.g., the roads may be plowed, or the snowstorm may not have impacted the particular area). The unified map improves on interfaces implemented by related art systems in which fleet managers use distinct interfaces (e.g., browser windows) for the different types of information.

In some embodiments, system 200 comprises condition prediction training module 231. System 200 uses condition prediction training module 231 to determine a condition prediction model. The condition prediction model is trained to make predictions of driving conditions, such as road and weather conditions. For example, the condition prediction model is trained to detect inclement weather exhibited by an image or to otherwise assess whether the road captured in the image is subject to inclement weather or other predefined driving condition. Condition prediction training module 231 implements a machine learning process to train the condition prediction model. In some embodiments, a machine learning process using a deep neural network is implemented to train the condition prediction model. However, various other machine learning processes may be implemented to obtain the condition prediction model. Examples of machine learning processes that can be implemented in connection with training the condition prediction model include deep neural network, random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, XGBoost, etc.

In some embodiments, the machine learning model predicts whether the road captured in the image is experiencing (or expected to experience) inclement weather based on the image and map data or weather data (e.g., weather data included in a map data). Condition prediction training module 231 trains the condition prediction model based on an improved selection of training images. In some embodiments, the training images are selected based on implementing an image sampling process. For example, condition prediction training module 231 trains or re-trains/updates the condition prediction model using a training set that is determined by identifying images of one or more classifications of road and weather conditions for which a confidence level of the classification of the image (e.g., by a machine learning model, such as the condition prediction model) exceeds a predefined confidence threshold. If the condition prediction model is trained using images selected based on the confidence level, the training set is a higher quality set of images that do not have conflicting classifications.

The condition prediction model is a machine learning model, such as a machine learning model trained using a training set of images for which a confidence of a certain classification of corresponding road and weather conditions exceeds a predefined training set confidence threshold. The predefined training set confidence threshold may be configurable, such as to allow for the sensitivity of the condition prediction model to be adjusted (e.g., by condition prediction training module 231). The condition prediction model is trained to predict a classification of one or more weather or driving conditions exhibited by an image.

In some embodiments, condition prediction training module 231 trains the condition prediction model to predict a classification of road and weather conditions for an image based on image data for the image and other information pertaining to the managed vehicle (e.g., context data, map data such as a unified map, or weather data for a location corresponding to the image). As an example, the condition prediction model classifies the road and weather conditions corresponding to the road (e.g., the road captured in the image) based on a predefined set of classifications. The predefined set of classifications have N different classifications, where N is a positive integer. Condition prediction training module 231 trains the condition prediction model based at least in part on the predefined set of classifications.

Examples of road conditions include clear road, wet road, snowy road (e.g., the road filled with snow or having an extent of snow in excess of snow threshold), icy road (e.g., the road filled with ice or having an extent of ice in excess of ice threshold). Various other road conditions may be implemented.

Examples of weather conditions include clear, rainy, snowy, icy, and foggy. Various other weather conditions may be implemented.

Examples of classifications for a predefined set of classifications having three different classifications include (i) clear or snowy weather and clear road condition, (ii) rainy or snow weather and wet road condition, and (iii) (a) foggy or icy weather conditions and all road conditions, or (b) snowy weather conditions and other road conditions (e.g., icy road condition ice, snowy road condition, etc.).

Examples of classifications for a predefined set of classifications having five different classifications include (i) clear or snowy weather and clear road condition, (ii) rainy or snowy weather and wet road condition, (iii) clear or rainy weather and snowy road condition, (iv) clear or rainy weather and icy road condition, (v) (a) foggy or icy weather condition and all road conditions, or (b) snowy weather and other road conditions (e.g., icy road condition ice, snowy road condition, etc.).

Examples of classifications for a predefined set of classifications having nine different classifications include (i) clear or snowy weather and clear road condition, (ii) rainy or snowy weather and wet road condition, (iii) clear or rainy weather and snowy road condition, (iv) clear or rainy weather and icy road condition, (v) rainy weather and snowy road condition, (vi) rainy weather and icy road condition, (vii) foggy weather and clear road condition, (viii) foggy weather and wet road condition, and (ix) (a) icy or rainy weather and clear road condition, (b) rainy weather and clear road condition, or (c) icy weather and other road conditions (e.g., icy road condition ice, snowy road condition, etc.).

In some embodiments, condition prediction training module 231 implements an image sampling process to select images with which to train/re-train the condition prediction model. The image sampling process includes performing a pre-classification prediction using image data and other context data such as unified map data (e.g., weather data comprised in the unified map). For example, system 200 (e.g., condition prediction training module 231) determines a location corresponding to the image being pre-classified, and system 200 obtains unified map data corresponding to that location (e.g., weather data, precipitation data, or temperature data for that location). The use of unified map data (e.g., weather data) in conjunction with the image data in order to classify an image can lead to a greater confidence level with respect to the classification. For example, if the image data has a high degree of similarity to features of a plurality of classifications, the use of the unified map data improves the accuracy of classifying the road and weather condition. If a certain image has a high degree of similarity between a wet road and an icy road, the weather data adds clarity on the proper classification. For example, if the image is taken at a location where the temperature is significantly above 32 degrees F., then the system may deem the road to be wet rather than icy and can improve the accuracy of the classification. Conversely, if the image is taken at a location where the temperature is at or below 32 degrees F., then the system may deem the road to be icy.

According to various embodiments, the image sampling process includes (i) sampling the images based on a set of attributes such as geographic location, time data, weather data (e.g., weather condition forecasted by a weather service for the corresponding time/location), (ii) from the sampled images, select the images based on the model predictions such that images for which classifications have a high confidence (e.g., a confidence level exceeding a predefined confidence threshold or otherwise having a distance in feature space that is less than a predefined feature space distance threshold) are pooled to train the model, (iii) provide the set of selected images for annotation (e.g., annotate the data according to the corresponding classification, such as the classification predicted by the model), and (iv) use the annotated data to train the model (e.g., the machine learning model). In some embodiments, the predefined confidence threshold is set relatively high, such as greater than 80 percent. Various other confidence thresholds may be implemented.

In some embodiments, condition prediction training module 231 uses the trained condition prediction model to evaluate their performance on the test set, and the evaluation results are used as a feedback metric to iterate the training process. As an example, the feedback mechanism for training the model includes using a previous model iteration of the condition prediction model to analyze images to identify classifications or attributes of images for which the previous model iteration is inaccurate (e.g., has a corresponding accuracy less than a predefined accuracy threshold). As another example, the feedback mechanism for training the model includes using the previous model iteration in connection with selecting a next set of images to be used to train/update the condition prediction model.

In some embodiments, condition prediction training module 231 determines (e.g., captures) various attributes pertaining to the images in the training set. Examples of attributes captured include road visibility, windshield surface, road surface, etc. Various other attributes may be captured. In connection with implementing the feedback mechanism (e.g., further training/re-training the model), condition prediction training module 231 uses one or more attributes pertaining to the images in the training set to identify those attributes for which the previous model iteration does not classify with sufficient accuracy (e.g., accuracy of classification is less than a predefined attribute classification accuracy threshold). For example, if condition prediction training module 231 determines that the model is not performing with sufficient accuracy with respect images for which the windshield has droplets, condition prediction training module 231 determines to further train the model with respect to such attributes. In response to determining that the previous model iteration is not performing with sufficient accuracy with respect to a particular attribute(s), condition prediction training module 231 determines to collect a greater number or percentage of images with such attribute(s) in the training set used to retrain/update the model. Using the example above, in response to determining that the previous model iteration does not have sufficiently accuracy with respect to classifying images for which the windshield has droplets, the system pools more images for which the windshield has droplets and adds those images to the training set for the next model iteration.

In some embodiments, condition prediction training module 231 uses a previous model iteration to select images to be included in the training set for the next model iteration. For example, for each iteration after the initial training of the model (e.g., which may be based on manual annotations), condition prediction training module 231 obtains the previous model iteration and implements the previous model iteration to classify a set of images. Condition prediction training module 231 selects a subset of images (e.g., a subset of the set of images) to use to train the subsequent model iteration based on a confidence level associated with the respective classifications for the set of images. For example, condition prediction training module 231 implements the pre-classification of the set of images using the previous model iteration and selects those images for which the previous model iteration predicts a classification with a confidence greater than a predefined confidence threshold for training the next iteration of the model. In some embodiments, the predefined confidence threshold used in the pre-classification (e.g., filtering of images to select the images to use to in training/re-training the model) is configurable or is different across iterations. For example, the greater the number of iterations over which the model has been trained, the smaller the predefined confidence threshold used to select images for a training set. In the initial iterations, condition prediction training module 231 pools easy samples (e.g., images for which the confidence level is sufficiently high) that have a high inter-class dissimilarity. For example, in the case of classifying road and weather conditions, condition prediction training module 231 classifies the images to detect heavy rain weather conditions compared to light rain weather conditions. In other words, differentiating the heavy rain images may be easier for the model than differentiating light rain conditions. After the condition prediction model is trained (e.g., a more stable model) using easy samples (e.g., samples having a high degree of dissimilarity across classifications), later iterations of training/re-training the model may implement more difficult samples (e.g., samples having a lesser degree of dissimilarity across classifications).

In some embodiments, system 200 comprises condition prediction module 233. System 200 uses condition prediction module 233 to determine whether a managed vehicle is encountering, or expected to encounter, a driving condition such as inclement weather or other predefined classification. Condition prediction module 233 uses (e.g., queries) the condition prediction model to detect inclement weather or other driving condition exhibited by an image pertaining to the managed vehicle. For example, condition prediction module 233 uses the image pertaining to the managed vehicle to query the condition prediction model to predict/determine a classification for the image (e.g., a road and weather classification, etc.).

In some embodiments, condition prediction module 233 queries the condition prediction model based on the image and corresponding unified map data (e.g., one or more types of data obtained from the unified map for the location corresponding to the image). As an example, the condition prediction model classifies the image, such as road and weather conditions corresponding to the road (e.g., the road captured in the image) based on a predefined set of classifications.

System 200 receive requests to update data (e.g., an updated assessment of driving conditions or road and weather conditions) for one or more managed vehicles, such as from a fleet manager or a driver of a managed vehicle. In connection with performing an inclement weather assessment or other driving condition assessment, condition prediction module 233 determines a location of the managed vehicle, obtains an image(s) corresponding to the location, and unified map data corresponding to the location. Condition prediction module 233 then queries the condition prediction model based on the image and the unified map.

The condition prediction model is used to analyze the image and corresponding unified map data (e.g., context data for the managed vehicle, such as precipitation levels, temperature, etc.) to predict whether the image is indicative of inclement weather (or to predict whether the vehicle is encountering, or expected to encounter, a particular driving condition).

In some embodiments, system 200 comprises inclement weather assessment module 235. System 200 uses inclement weather assessment module 235 to assess the driving conditions (e.g., road and weather conditions) indicated by the prediction from the condition prediction model and/or to determine whether to invoke an active measure. For example, inclement weather assessment module 235 determines whether the result from the condition prediction model corresponds to unsafe road and weather conditions (e.g., that the vehicle is encountering/expected to encounter inclement weather). As an example, in response to classifying the image and/or corresponding unified map data, inclement weather assessment module 235 assesses whether the vehicle is encountering, or expected to encounter, a particular driving condition such as inclement weather. As an example, in response to determining that the image and the unified map data is indicative of the road being icy (e.g., a relatively high level of precipitation and a temperature less than freezing), inclement weather assessment module 235 determines that the vehicle is expected to encounter adverse/unsafe road and weather conditions.

In some embodiments, system 200 comprises active measure module 237. System 200 uses active measure module 237 to determine whether to invoke/implement an active measure and/or determine, recommend, and/or implement one or more active measures. In some embodiments, active measure module 237 determines an active measure to recommend or automatically implement based at least in part on the driving condition classification (e.g., the classification for road and weather condition) and/or the unified map data. For example, active measure module 237 uses an identified driving condition to recommend active measures to eliminate or mitigate the driving condition. Examples of active measures include: (i) re-routing a managed vehicle (e.g., a managed vehicle expected to be impacted by a particular driving condition such as inclement weather), (ii) alerting the driver of the managed vehicle, (iii) alerting the fleet manager, (iv) sending a set of recommended routes or other actions to a fleet manager or driver, etc.

In some embodiments, active measure module 237 determines whether to perform an active measure based at least in part on the determination of whether the driving condition classification (e.g., the classification for road and weather conditions) satisfies one or more applicable conditions. Active measure module 237 may further determine a recommended active measure (provide recommendations for alternative routes or other mitigation techniques, such provide a recommended speed or a recommended speed reduction), or may determine to perform a predefined active measure (e.g., sending an alert to a fleet manager, driver, etc.). Active measure module 237 may use an active measure policy to determine an applicable active measure that is to be performed. Examples of active measures include: (i) re-routing a managed vehicle (e.g., a managed vehicle expected to be impacted by a particular driving condition), (ii) alerting the driver of the managed vehicle, (iii) sending the image to a driver or fleet manager, (iv) providing a recommendation for speed at which the vehicle is to travel through the impacted area or a recommendation for reducing a current vehicle speed, etc. System 200 may implement various other active measures.

As an example, in the case that system 200 implements a 3-class classification of road and weather conditions may determine the active measure based on the mapping in Table 1 above. The system sends an indication to the managed vehicle (e.g., the driver) of a speed recommendation. The mapping of classifications to active measures may be predefined such as based on an active measure policy.

As an example, in the case that system 200 implements a 5-class classification of road and weather conditions may determine the active measure based on the mapping in Table 2 above. The system sends an indication to the managed vehicle (e.g., the driver) of a speed recommendation. The mapping of classifications to active measures may be predefined such as based on an active measure policy.

As an example, in the case that system 200 implements a 9-class classification of road and weather conditions may determine the active measure based on the mapping in Table 3 above. The system sends an indication to the managed vehicle (e.g., the driver) of a speed recommendation. The mapping of classifications to active measures may be predefined such as based on an active measure policy.

The active measures implemented by active measure module 237 may be set according to a predefined active measure policy. The active measures may be configurable, such as based on a fleet preference or setting. As an example, the speed recommendations in Tables 1-3 may be configurable by a fleet manager.

In some embodiments, in response to determining that the vehicle satisfies the one or more applicable conditions, such as that the vehicle is deemed to be travelling on a road experiencing inclement weather, active measure module 237 determines to provide an alert to the fleet manager and/or applicable driver. The alert may further include one or more recommended active measures, such as one or more alternative routes for the vehicle or other recommended speeds.

Active measure module 237 may use the unified map (e.g., unified map data) to determine an active measure. In the case that system 200 is to provide one or more active measures, active measure module 237 may determine a plurality of active measures that can be performed and may use a scoring function to assess the various active measures. Active measure module 237 may filter the set of proposed active measures based on comparing the composite scores (e.g., according to a predefined scoring function or cost function) for the active measures to an active measure score threshold and recommend those active measures having a composite score that is greater than the active measure score threshold. For example, active measure module 237 identifies active measures that would place the vehicle in a state in which the vehicle is likely to not be deemed unsafe, is likely to not be impacted by a driving condition/hazard, etc. In some embodiments, active measure module 237 selects a predefined number of the active measures having a composite score greater than the active measure score threshold and provides a recommendation of the predefined number of active measures. For example, active measure module 237 provides the set of M active measures having the highest corresponding composite score, where M is a positive integer that may be configurable such as by an administrator, etc.

Active measure module 237 implements an active measure. System 200 may store an active measure policy that indicates a mapping of scenarios/contexts to active measure. For example, the active measure policy indicates an active measure to perform in response to determining that the vehicle is experiencing, or expected to encounter, inclement weather or other hazardous driving condition. As another example, the active measure policy indicates the active measure to perform in response to determining that the vehicle is likely to be impacted by a driving condition (e.g., inclement weather or hazardous driving condition, etc.). In response to determining the context/state of the vehicle (e.g., context based on context information or unified map data), active measure module 237 may query the mapping of scenarios/contexts to active measure to determine the applicable active measure.

In some embodiments, the active measure includes providing a user with a set of recommended active measures. For example, the active measure includes causing an alert/prompt to be displayed at a client device (e.g., a system used by the fleet manager or a driver of the vehicle) and an indication of recommended active measures that may be performed to alleviate the particular context of the vehicle (e.g., the vehicle encountering inclement weather, the vehicle expected to be impacted by a parking condition/hazard, etc.). For example, active measure module 237 automatically generates and communicates the alert or prompt to the client device in response to detecting the applicable context/scenario, such as detecting that the vehicle is travelling through a blizzard or other snowy conditions. Active measure module 237 may receive a user input (e.g., via user interface module 239) of the selected active measure, and in response to receiving the selection cause the selected active measure to be implemented. As an example, in the context where the vehicle is traveling on a part of a road classified as icy, the set of recommended active measures may include a recommendation pertaining to vehicle speed or re-routing the vehicle to a route that avoids icy roads (or that reduces the extent to which the vehicle is impacted by ice or other hazardous conditions). In response to receiving selection of an alternate route, system 200 (e.g., active measure module 237) determines the alternate route, such as based on a current location of the vehicle and a destination location for the vehicle. System 200 can provide the route to the user, such as the driver of the vehicle.

In some embodiments, system 200 comprises user interface module 239. System 200 uses user interface module 239 to provide a user interface to a user (e.g., via a client system such as for a fleet manager or a driver of a managed vehicle, etc.) via which the user configures, defines, or develops data entities, policies, preferences, cost functions (e.g., a scoring function), models (e.g., driving condition prediction models), access permissions with respect to certain data (e.g., the unified map or alerts generated for a managed vehicle), etc., or via which the user interfaces with the unified map (e.g., adjusts the zoom, selects an indicator, requests an image, selects a recommended active measure, etc.).

According to various embodiments, storage 215 comprises one or more of file system data 260, vehicle data 265, and/or unified map data 270. Storage 215 comprises a shared storage (e.g., a network storage system) and/or database data, and/or user activity data.

In some embodiments, file system data 260 comprises a database such as one or more datasets for data entities (e.g., one or more datasets for one or more features, models, schemas, tables, unified maps, unified map data, configurations for managed vehicles, fleets, drivers, etc.). File system data 260 can store various policies a routing policy, a notification policy, an active measure policy, etc. In some embodiments, file system data 260 comprises the condition prediction module and image data, such as a training set.

In some embodiments, vehicle data 265 comprises information pertaining to a vehicle, such as one or more of vehicle location, time vehicle was last detected to be moving, vehicle speed, vehicle direction of travel, driver associated with the vehicle, destination location for the vehicle, payload information, an image captured by a camera mounted to the vehicle, or other information pertaining to the vehicle or context of the vehicle.

In some embodiments, unified map data 270 comprises map data, road data, traffic data, weather data, hazard data, historical collision data, exclusion data (e.g., data indicating one or more exclusion zones). The unified map data 270 may include various other types of data. Unified map data 270 may include information for a particular tenant/customer, or information across various tenants/customer serviced by system 200.

According to various embodiments, memory 220 comprises executing application data 275. Executing application data 275 comprises data obtained or used in connection with executing an application such as an application executing in connection with managing vehicles, an application executing to assess vehicle travel (e.g., an inclement weather assessment, an assessment of whether the vehicle is expected to encounter a driving condition), an application executing to generate unified maps, an application executing to determine, recommend or implement active measures, an application that processes and/or responds to queries, an application that generates models for detecting (e.g., predicting) driving conditions, etc. Other applications comprise any other appropriate applications (e.g., an index maintenance application, a communications application, a chat application, a web browser application, an image analysis application, a report preparation application, a user interface application, a data analysis application, an anomaly detection application, a user authentication application, a security policy enforcement application, a code analysis application, a code development application, etc.).

Figure 3:
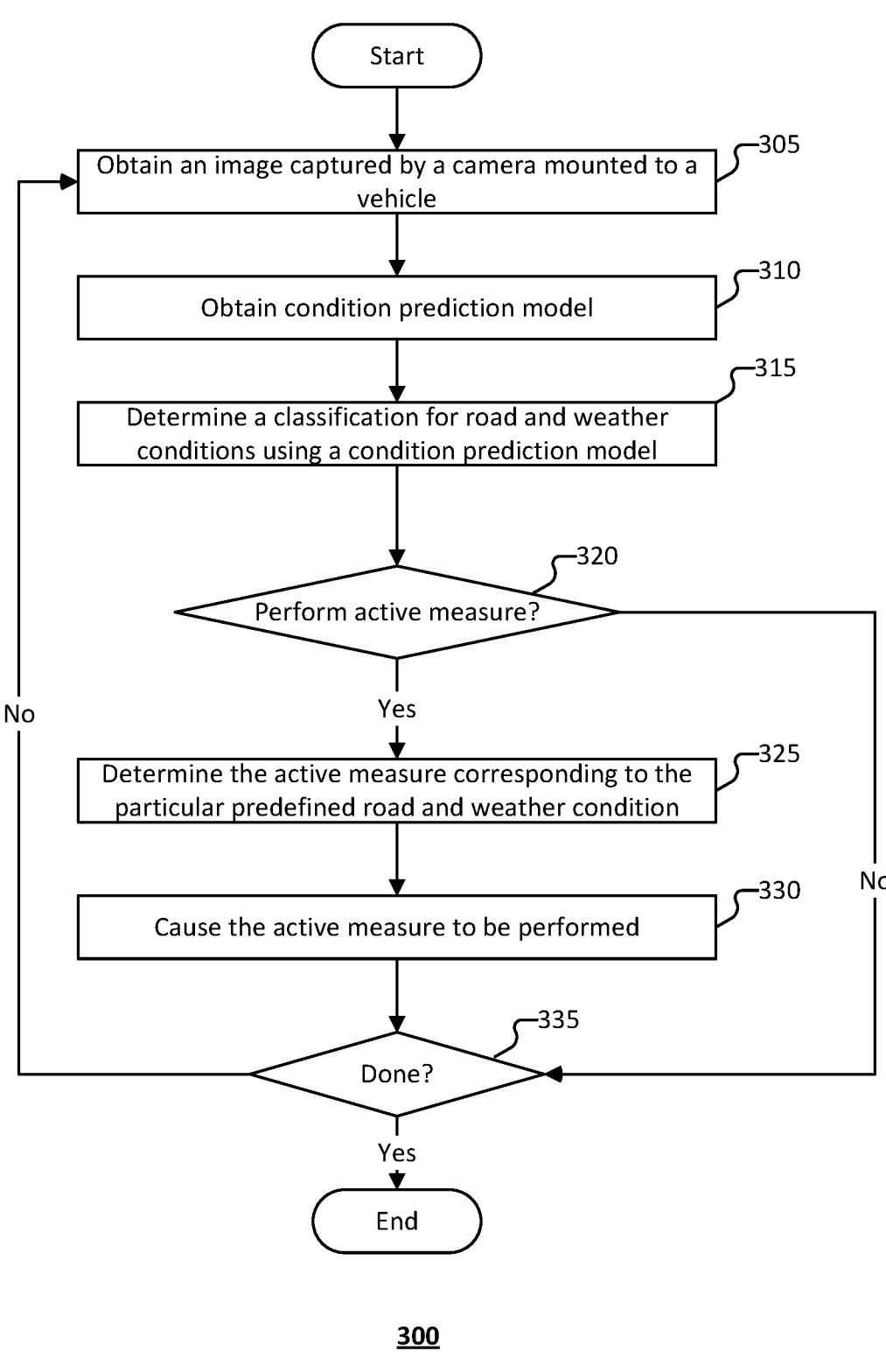
FIG. 3 is a flow diagram of a method for performing an active measure based on a classification for road and weather conditions according to various embodiments of the present application.

FIG. 3 is a flow diagram of a method for performing an active measure based on a classification for road and weather conditions according to various embodiments of the present application. In some embodiments, process 300 is implemented by system 100 of FIG. 1 and/or system 200 of FIG. 2.

At 305, an image captured by a camera mounted to a vehicle is obtained. In some embodiments, the system obtains the image from the vehicle (e.g., from a vehicle event recorder camera that is mounted in a vehicle cabin). For example, the system queries the vehicle for a current image (or a recent image), such as in response to receiving a request for an inclement weather assessment, etc. As another example, the vehicle sends captured images to the system according to a predefined frequency, etc.

At 310, the condition prediction model is obtained. The condition prediction model is a machine learning model that provides a prediction of a classification for the image and/or other data such as map data.

At 315, a classification for road and weather conditions is determined using a condition prediction model. In response to receiving the image, the system queries the condition prediction model based at least in part on the image. In some embodiments, the system queries the condition prediction model based on the image and other information such as unified map data, or information pertaining to the vehicle (e.g., context information for the vehicle).

At 320, the system determines whether to perform an active measure. The system determines whether to perform the active measure based on the classification for road and weather conditions. For example, if the classification for the road and weather conditions corresponds to safe driving conditions, then the system determines not to perform an active measure. Conversely, if the classification for the road and weather conditions corresponds to unsafe driving conditions (e.g., the road experiencing inclement weather), then the system determines to perform the active measure.

In response to determining that an active measure is not to be performed at 320, process 300 proceeds to 335. Conversely, in response to determining that the system is to perform the active measure, in 325 the system determines an active measure corresponding to the particular classification for the road and weather conditions. For example, the system stores a mapping of active measures to road and weather conditions, and the system determines whether the active measure mapped to the classification for the road and weather conditions.

At 330, the system causes the active measure to be performed. For example, an alert is sent (e.g., to an administrator, fleet manager, driver, etc.). As another example, information or instructions are sent (e.g., re-routing information, stopping instructions, driving instructions, etc.).

At 335 a determination is made as to whether process 300 is complete. In some embodiments, process 300 is determined to be complete in response to a determination that no further images are to be assessed for determination of road and weather conditions, no further determinations of road and weather conditions for managed vehicles are to be performed, no vehicles in the fleet are active or driving, a user has exited the system, a user indicates that process 300 is to be paused or stopped, etc. In response to a determination that process 300 is complete, process 300 ends. In response to a determination that process 300 is not complete, process 300 returns to 305.

FIG. 4 is a flow diagram of a method for performing an active measure based on a classification for road and weather conditions according to various embodiments of the present application. In some embodiments, process 400 is implemented by system 100 of FIG. 1 and/or system 200 of FIG. 2.

At 405, a managed vehicle is selected. In some embodiments, the managed vehicle is selected based on a user input, such as selection by a fleet manager in connection with a request to perform an inclement weather assessment or otherwise assess the driving conditions for the managed vehicle. In some embodiments, the managed vehicle is selected automatically as the system iterates over a fleet of one or more managed vehicles in connection with performing the inclement weather assessment or otherwise assess the driving conditions for the managed vehicles in the fleet.

At 410, an image captured by a camera mounted to a managed vehicle is obtained. In some embodiments, 410 corresponds to, or is similar to, 305 of process 300.

At 415, a classification for road and weather conditions is determined using a condition prediction model. In some embodiments, 415 corresponds to, or is similar to, 315 of process 300.

At 420, an active measure corresponding to the classification for road and weather conditions is determined. In some embodiments, 420 corresponds to, or is similar to, 325 of process 300.

At 425, the system causes the active measure to be performed for the selected managed vehicle. In some embodiments, 425 corresponds to, or is similar to, 330 of process 300.

At 430, a determination is made as to whether process 400 is complete. In some embodiments, process 400 is determined to be complete in response to a determination that no further images are to be assessed for determination of road and weather conditions, no further determinations of road and weather conditions for managed vehicles are to be performed, no vehicles in the fleet are active or driving, a user has exited the system, a user indicates that process 400 is to be paused or stopped, etc. In response to a determination that process 400 is complete, process 400 ends. In response to a determination that process 400 is not complete, process 400 returns to 405.

FIG. 5 is a flow diagram of a method for predicting a classification for road and weather conditions according to various embodiments of the present application. In some embodiments, process 500 is implemented by system 100 of FIG. 1 and/or system 200 of FIG. 2. In some embodiments, process 500 is invoked by process 300 of FIG. 3 and/or process 400 of FIG. 4. For example, process 500 is invoked by 315 of process 300. As another example, process 500 is invoked by 415 of process 400.

At 505, context data is obtained. In some embodiments, the system obtains context data for the vehicle. The context data includes the image corresponding to the vehicle (e.g., a location corresponding to a current location of the vehicle), geolocation data for the vehicle, and unified map data (e.g., weather data, traffic data, etc.).

At 510, a condition prediction model is queried based on the context data. The condition prediction model analyzes the context data, determines attributes of the context data, and determines a prediction of the classification for the road and weather conditions corresponding to the location of the vehicle.

At 515, a prediction of a classification for road and weather conditions matching the context data is received. The system receives the prediction for the classification for road and weather conditions based on the querying of the condition prediction model.

At 520, the system determines whether a confidence of the prediction of the classification for road and weather conditions exceeds a confidence threshold. The confidence threshold may be predefined, such as by a fleet manager or by an inclement weather assessment policy.

In response to determining that the confidence of the prediction of the classification for road and weather conditions does not exceed a confidence threshold at 520, process 500 proceeds to 530. The system may then determine whether to determine another prediction for the classification for road and weather conditions and/or determine a prediction for another classification for road and weather conditions.

In response to determining that the confidence of the prediction of the classification for road and weather conditions exceeds a confidence threshold at 520, process 500 proceeds to 525 at which the indication of the classification for road and weather conditions is provided. For example, in response to determining that a confidence of a prediction exceeds a predefined confidence threshold, the system deems the prediction to be correct (e.g., deem the road and weather conditions corresponding to an image or a managed vehicle to match the predicted classification for road and weather conditions).

At 530, a determination is made as to whether process 500 is complete. In some embodiments, process 500 is determined to be complete in response to a determination that no further images are to be assessed for determination of road and weather conditions, no further determinations of road and weather conditions for managed vehicles are to be performed, no vehicles in the fleet are active or driving, a user has exited the system, a user indicates that process 500 is to be paused or stopped, etc. In response to a determination that process 500 is complete, process 500 ends. In response to a determination that process 500 is not complete, process 500 returns to 505.

Figure 6:
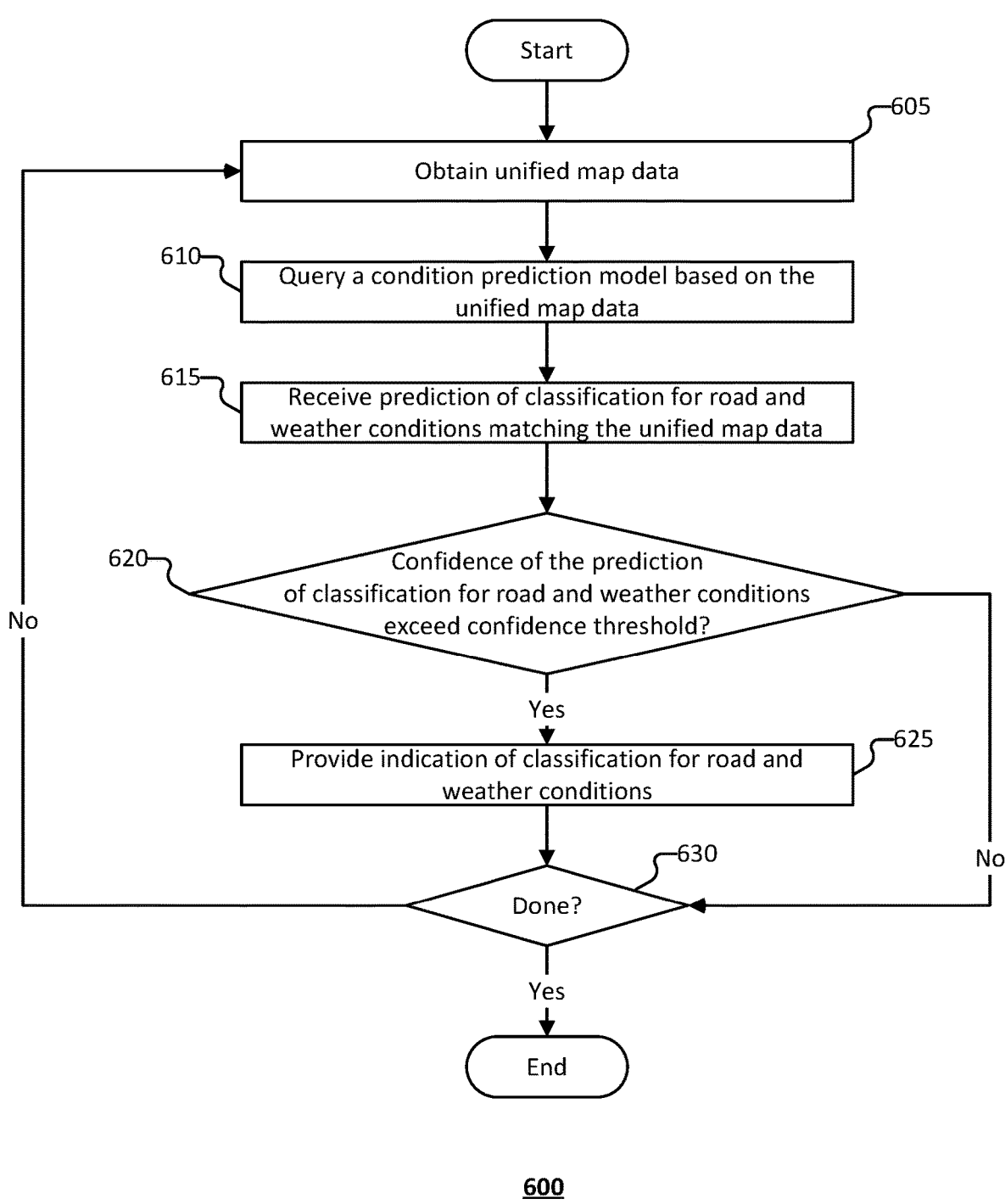
FIG. 6 a flow diagram of a method for predicting a classification for road and weather conditions according to various embodiments of the present application.

FIG. 6 a flow diagram of a method for predicting a classification for road and weather conditions according to various embodiments of the present application. In some embodiments, process 600 is implemented by system 100 of FIG. 1 and/or system 200 of FIG. 2. In some embodiments, process 600 is invoked by process 300 of FIG. 3 and/or process 400 of FIG. 4. For example, process 600 is invoked by 315 of process 300. As another example, process 600 is invoked by 415 of process 400.

At 605, unified map data is obtained. In some embodiments, the system obtains the unified map data corresponding to the location of the vehicle for which the inclement weather assessment (or other assessment pertaining to driving conditions) is to be performed. For example, the system obtains weather data for the location of the vehicle. In some embodiments, the unified map data includes recent images captured by one or more other managed vehicles or traffic cameras.

At 610, a condition prediction model is queried based at least in part on the unified map data. In response to receiving the unified map data, the system queries the condition prediction model based at least in part on the unified map data. In some embodiments, the system queries the condition prediction model based on the unified map data and an image corresponding to a location of the vehicle or other information pertaining to the vehicle (e.g., context information for the vehicle).

At 615, a prediction of a classification for road and weather conditions matching the context data is received. The system receives the prediction for the classification for road and weather conditions based on the querying of the condition prediction model.

At 620, the system determines whether a confidence of the prediction of the classification for road and weather conditions exceeds a confidence threshold. The confidence threshold may be predefined, such as by a fleet manager or by an inclement weather assessment policy.

In response to determining that the confidence of the prediction of the classification for road and weather conditions does not exceed a confidence threshold at 620, process 600 proceeds to 630. The system may then determine whether to determine another prediction for the classification for road and weather conditions and/or determine a prediction for another classification for road and weather conditions.

In response to determining that the confidence of the prediction of the classification for road and weather conditions exceeds a confidence threshold at 620, process 600 proceeds to 625 at which the indication of the classification for road and weather conditions is provided. For example, in response to determining that a confidence of a prediction exceeds a predefined confidence threshold, the system deems the prediction to be correct (e.g., deem the road and weather conditions corresponding to an image or a managed vehicle to match the predicted classification for road and weather conditions).

At 630, a determination is made as to whether process 600 is complete. In some embodiments, process 600 is determined to be complete in response to a determination that no further images are to be assessed for determination of road and weather conditions, no further determinations of road and weather conditions for managed vehicles are to be performed, no vehicles in the fleet are active or driving, a user has exited the system, a user indicates that process 600 is to be paused or stopped, etc. In response to a determination that process 600 is complete, process 600 ends. In response to a determination that process 600 is not complete, process 600 returns to 605.

Figure 7:
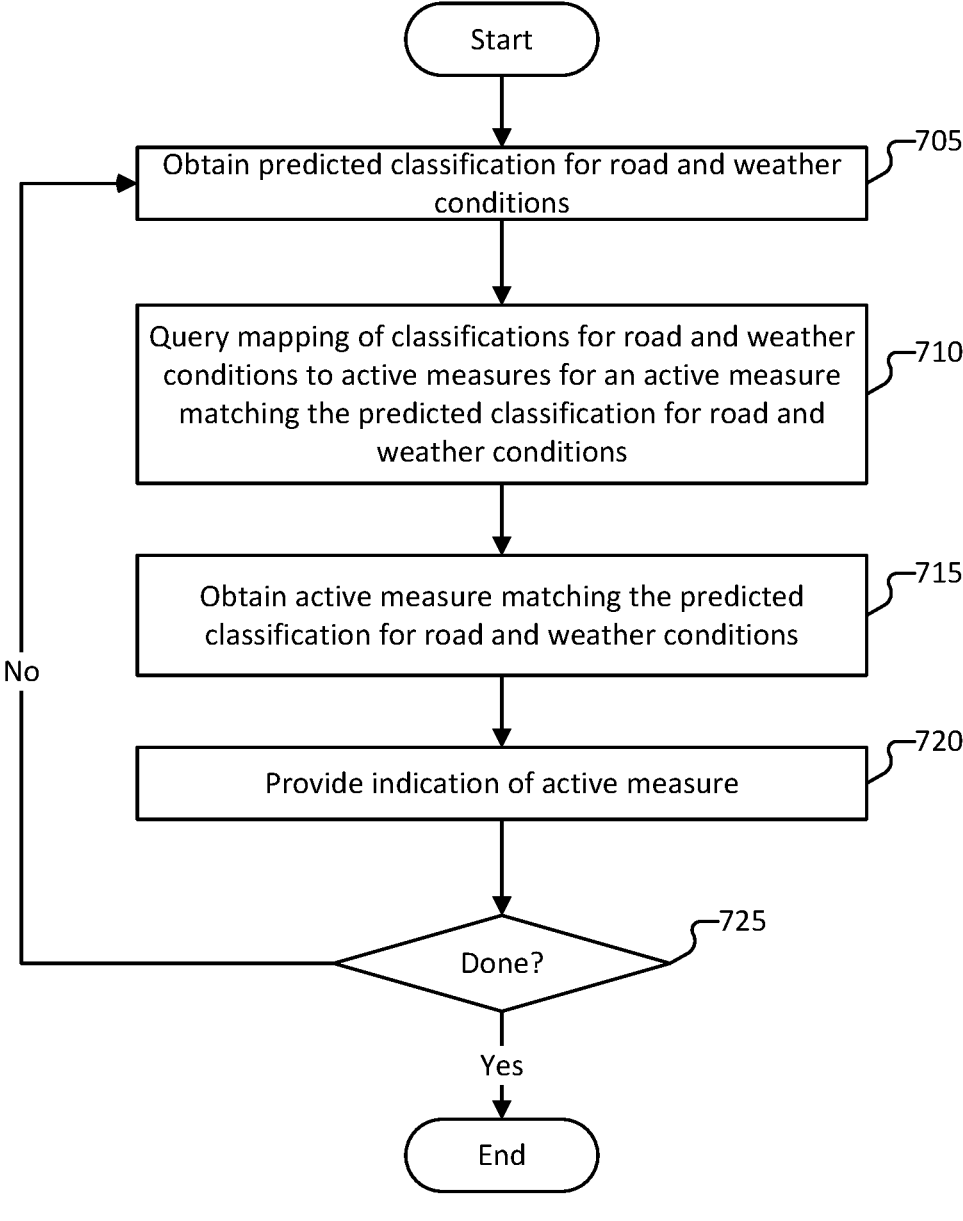
FIG. 7 is a flow diagram of a method for determining an active measure based on a predicted classification for road and weather conditions according to various embodiments of the present application.

FIG. 7 is a flow diagram of a method for determining an active measure based on a predicted classification for road and weather conditions according to various embodiments of the present application. In some embodiments, process 700 is implemented by system 100 of FIG. 1 and/or system 200 of FIG. 2. In some embodiments, process 700 is invoked by process 300 of FIG. 3 and/or process 400 of FIG. 4. For example, process 700 is invoked by 325 of process 300. As another example, process 700 is invoked by 420 of process 400.

At 705, a predicted classification for road and weather conditions is obtained. As an example, the predicted classification is obtained based on 525 of process 500, or 625 of process 600.

At 710, the system queries a mapping of classifications for road and weather conditions to active measures in connection with determining an active measure matching the predicted classification for road and weather conditions.

At 715, an active measure matching the predicted classification for road and weather conditions is obtained. For example, the system determines the matching active measure based on results of the querying the mapping of classifications for road and weather conditions to active measures.

At 720, an indication of the active measure is provided. In some embodiments, the system provides the indication of the active measure to the fleet manager, the driver of the corresponding vehicle, or other system/service. As an example, the indication is provided to the user, system, or process that invoked process 700, such as to 325 of process 300 or to 420 of process 400. The indication of the active measure may include a set of recommended active measures, and the system may implement a particular recommended active measure based on user selection.

At 725, a determination is made as to whether process 700 is complete. In some embodiments, process 700 is determined to be complete in response to a determination that no further active measures are to be determined or performed, no vehicles in the fleet are active or driving, a user has exited the system, a user indicates that process 700 is to be paused or stopped, etc. In response to a determination that process 700 is complete, process 700 ends. In response to a determination that process 700 is not complete, process 700 returns to 705.

Figure 8:
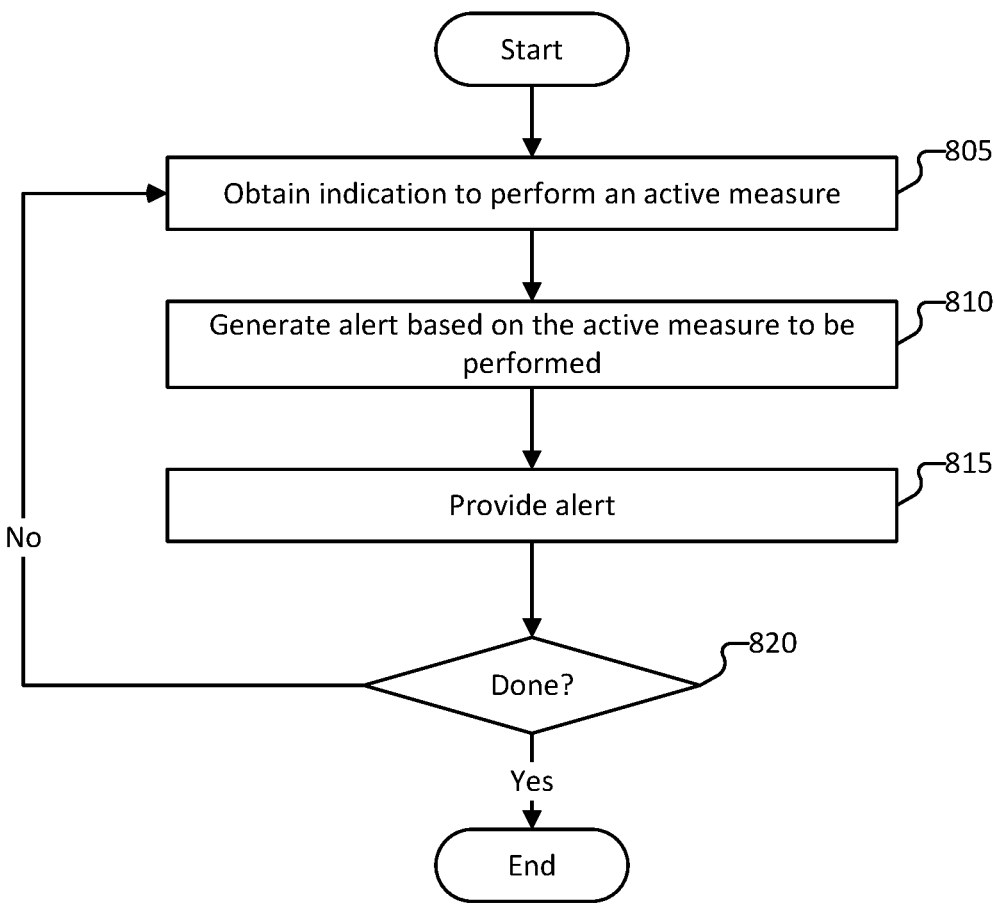
FIG. 8 is a flow diagram of a method for performing an active measure according to various embodiments of the present application.

FIG. 8 is a flow diagram of a method for performing an active measure according to various embodiments of the present application. In some embodiments, process 800 is implemented by system 100 of FIG. 1 and/or system 200 of FIG. 2. In some embodiments, process 800 is invoked by process 300 of FIG. 3 and/or process 400 of FIG. 4. For example, process 800 is invoked by 330 of process 300. As another example, process 800 is invoked by 425 of process 400.

At 805, an indication to perform an active measure is obtained. The system obtains the indication to perform the active measure in response to the system determining the classification for the road and weather conditions is unsafe or otherwise mapped to a particular active measure.

At 810, an alert is generated based on the active measure to be performed. As an example, the alert comprises a set of recommended active measures from which a user (e.g., the fleet manager, a driver, etc.) is to select a desired active measure. As another example, the alert may indicate the active measure to be performed, such as an instruction to the driver to reduce the speed of the vehicle, or an updated route reflecting a re-routing of the vehicle to avoid (or lessen the extent to which the vehicle is impacted by) the inclement weather or other driving condition (e.g., unsafe/hazardous driving condition).

At 815, the alert is provided. The system can provide the alert to a fleet manager, the driver of the corresponding vehicle, and/or another system.

At 820, a determination is made as to whether process 800 is complete. In some embodiments, process 800 is determined to be complete in response to a determination that no further active measures are to be determined or performed, no vehicles in the fleet are active or driving, a user has exited the system, a user indicates that process 800 is to be paused or stopped, etc. In response to a determination that process 800 is complete, process 800 ends. In response to a determination that process 800 is not complete, process 800 returns to 805.

Figure 9:
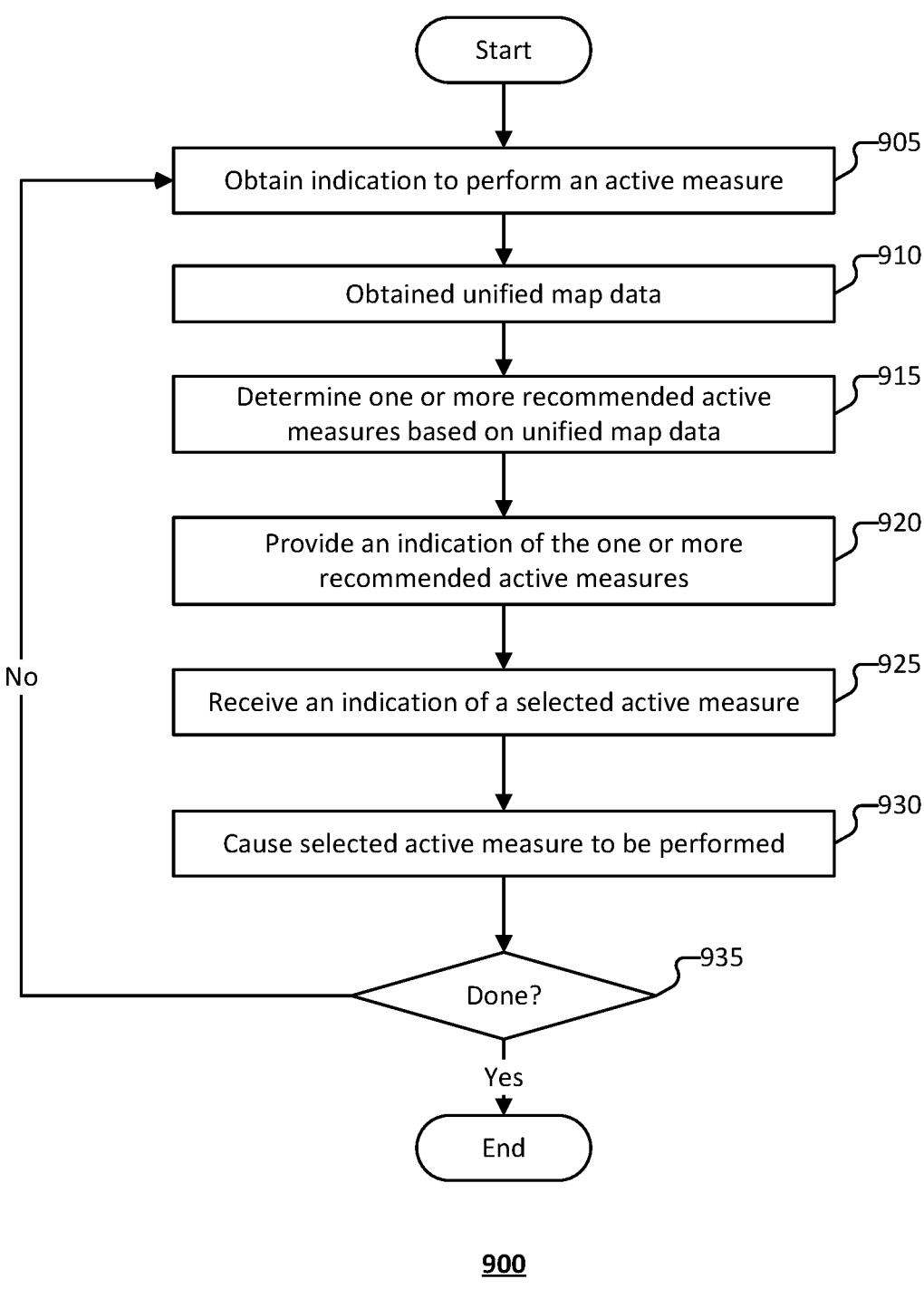
FIG. 9 is a flow diagram of a method for performing an active measure according to various embodiments of the present application.

FIG. 9 is a flow diagram of a method for performing an active measure according to various embodiments of the present application. In some embodiments, process 900 is implemented by system 100 of FIG. 1 and/or system 200 of FIG. 2. In some embodiments, process 900 is invoked by process 300 of FIG. 3 and/or process 400 of FIG. 4. For example, process 900 is invoked by 325 or 330 of process 300. As another example, process 900 is invoked by 420 or 425 of process 400.

At 905, an indication to perform an active measure is obtained. The system obtains the indication to perform the active measure in response to the system determining the classification for the road and weather conditions is unsafe or otherwise mapped to a particular active measure.

At 910, unified map data is obtained.

At 915, one or more recommended active measures are determined based at least in part on the unified map data.

In some embodiments, the active measure includes a re-routing of the vehicle to an alternate route to the destination location. The re-routing may be implemented to avoid the driving condition (e.g., inclement weather, hazardous driving condition, etc.) or to lessen the extent to which the driving condition negatively impacts the vehicle (e.g., to reduce a distance over which the vehicle is expected to encounter the driving condition). The system uses the map data in connection with determining the alternate route(s).

In some embodiments, the active measure includes recommending a speed or a change of speed of the vehicle. The system determines the recommended speed or change of speed based on road data comprised in the unified map data. Further, the system may determine the recommended speed or change of speed based on a road classification, such as a determination that the road is an interstate highway, a single lane highway, a rural road, a city street, etc.

At 920, an indication of the one or more recommended active measures is provided. The system can provide the indication of the one or more recommended active measures to a fleet manager, the driver of the corresponding vehicle, and/or another system. In some embodiments, the indication includes a prompt for the user to select an active measure from the one or more recommended active measures. For example, the indication may include one or more selectable elements (e.g., buttons) via which a user may select a desired active measure to be implemented.

At 925, an indication of a selected active measure is received. The system receives the selected active measure from the user, such as a fleet manager or the driver of the vehicle.

At 930, the system causes the selected active measure to be performed. In response to receiving the indication of the selected active measure, the system implements the selected active measure. For example, the system re-routes the vehicle according to a selected route. As another example, the system determines the speed that the vehicle is to travel while encountering the road and weather conditions. As another example, the system determines an alert to be provided to a driver based on selection, by the fleet manager, of the type of alert.

At 935, a determination is made as to whether process 900 is complete. In some embodiments, process 900 is determined to be complete in response to a determination that no further active measures are to be determined or performed, no vehicles in the fleet are active or driving, a user has exited the system, a user indicates that process 900 is to be paused or stopped, etc. In response to a determination that process 900 is complete, process 900 ends. In response to a determination that process 900 is not complete, process 900 returns to 905.

Figure 10:
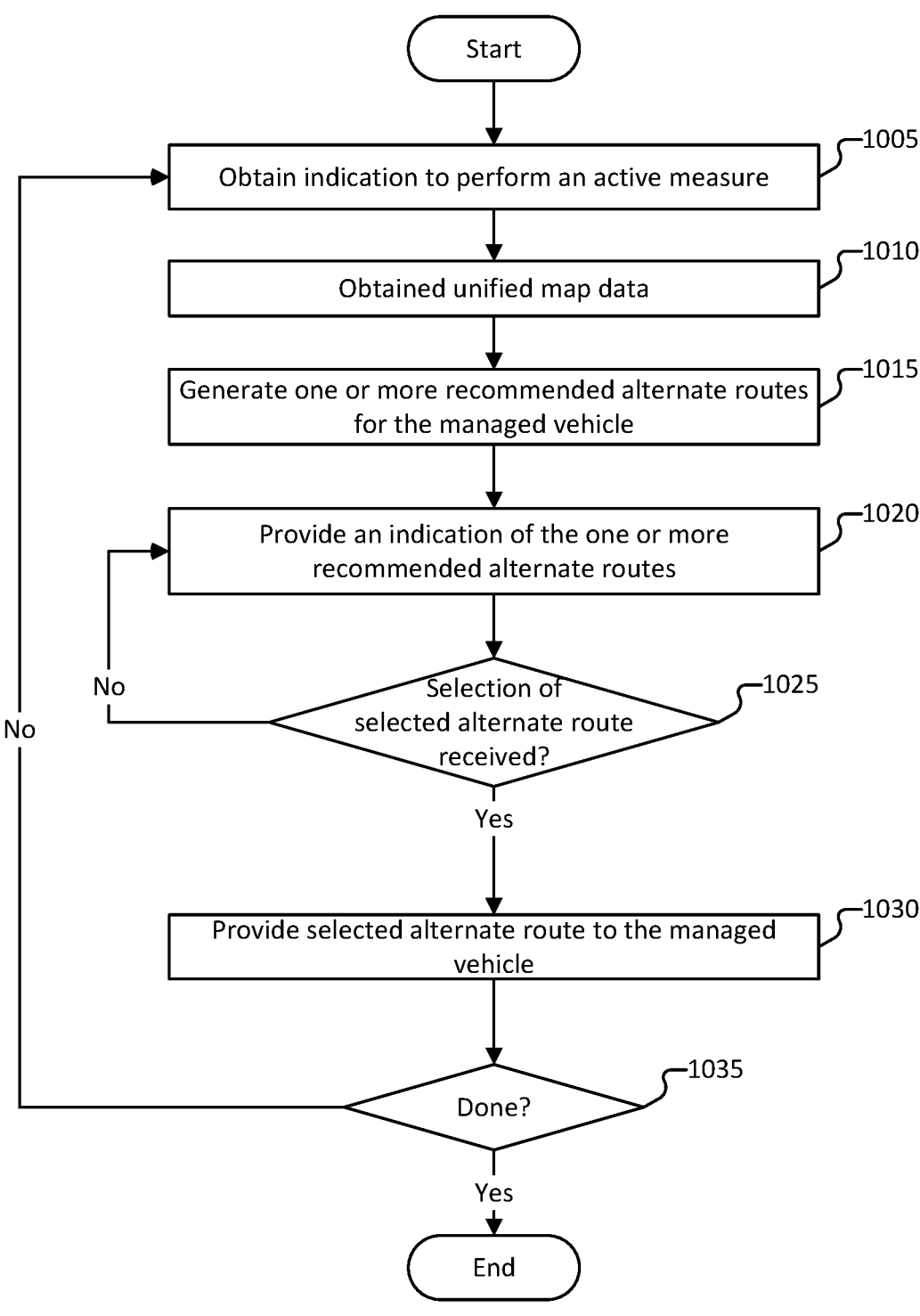
FIG. 10 is a flow diagram of a method for performing an active measure according to various embodiments of the present application.

FIG. 10 is a flow diagram of a method for performing an active measure according to various embodiments of the present application. In some embodiments, process 1000 is implemented by system 100 of FIG. 1 and/or system 200 of FIG. 2. In some embodiments, process 1000 is invoked by process 300 of FIG. 3 and/or process 400 of FIG. 4. For example, process 1000 is invoked by 325 or 330 of process 300. As another example, process 1000 is invoked by 420 or 425 of process 400.

At 1005, an indication to perform an active measure is obtained. In some embodiments, 1005 corresponds to, or is similar to, 910 of process 900.

At 1010, unified map data is obtained.

At 1015, one or more recommended alternate routes are generated for the managed vehicle. The one or more recommended alternate routes measures are determined based at least in part on the unified map data.

At 1020, an indication of the one or more recommended alternate route is provided. The system can provide the indication of the one or more recommended alternate routes to a fleet manager, the driver of the corresponding vehicle, and/or another system. In some embodiments, the indication includes a prompt for the user to select an alternate route from the one or more recommended alternate routes. For example, the indication may include one or more selectable elements (e.g., buttons) via which a user may select a desired alternate route to be implemented.

At 1025, the system determines whether a selection of a selected alternate route is received. In response to determining that a selection of the selected alternate route is not received, process 1000 returns to 1020 and process 1000 may iterate over 1020-1025 until the system receives selection of the selected alternate route. Conversely, in response to determining that selection of the selected alternate route is received, process 1000 proceeds to 1030 at which the alternate route is provided to the managed vehicle.

At 1035, a determination is made as to whether process 1000 is complete. In some embodiments, process 1000 is determined to be complete in response to a determination that no further active measures are to be determined or performed, no vehicles in the fleet are active or driving, a user has exited the system, a user indicates that process 1000 is to be paused or stopped, etc. In response to a determination that process 1000 is complete, process 1000 ends. In response to a determination that process 1000 is not complete, process 1000 returns to 1005.

Figure 11:
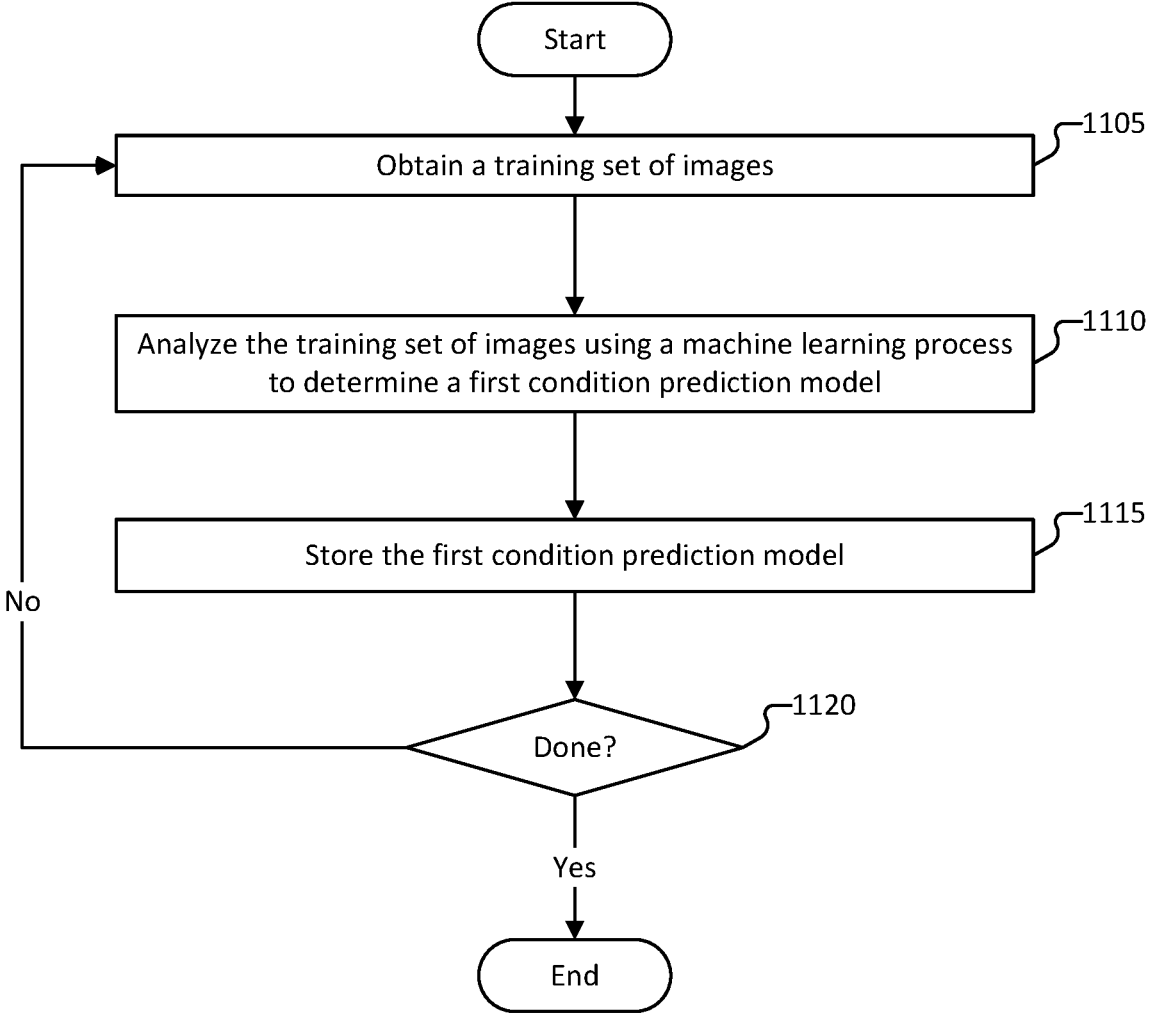
FIG. 11 is a flow diagram of a method for training a condition prediction model according to various embodiments of the present application.

FIG. 11 is a flow diagram of a method for training a condition prediction model according to various embodiments of the present application. In some embodiments, process 1100 is implemented by system 100 of FIG. 1 and/or system 200 of FIG. 2.

At 1105, a training set of images is obtained. The training set of images is obtained from a dataset. In some embodiments, the system determines the training set of images is selected based on an annotation to the various images. The annotations may indicate an attribute of an image or a type of an image. Examples of attributes captured include road visibility, windshield surface, road surface, etc. Various other attributes may be captured.

The initial training set is manually classified/annotated or is pre-classified by a third-party service. In response to receiving the initial training set, the system uses a machine learning process to determine the condition prediction model (e.g., an initial iteration of the model) based at least in part on the initial training set.

In the case of re-training or updating the condition prediction model, the system uses the previous iteration of the model (e.g., the initial iteration of the model in the case of a first update) to identify images for which a classification has a corresponding confidence score/level above a predefined confidence threshold. The system selects the training set of images for the retraining/updating based on the identification of images for which the classification has a corresponding confidence score/level above a predefined confidence threshold.

At 1110, the training set of images is analyzed using a machine learning process to determine a first condition prediction model. Examples of machine learning processes that can be implemented in connection with training the condition prediction model include deep neural network, random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, XGBoost, etc.

At 1115, the first condition prediction model is stored. In response to training the first condition prediction model, the first condition model is stored in a manner that the first condition model may be queried to provide predictions of a classification (e.g., a classification for road and weather conditions) or to be used in the re-training/updating of the condition prediction model.

At 1120, a determination is made as to whether process 1100 is complete. In some embodiments, process 1100 is determined to be complete in response to a determination that no further condition prediction models are to be trained, a user has exited the system, a user indicates that process 1100 is to be paused or stopped, etc. In response to a determination that process 1100 is complete, process 1100 ends. In response to a determination that process 1100 is not complete, process 1100 returns to 1105.

Figure 12:
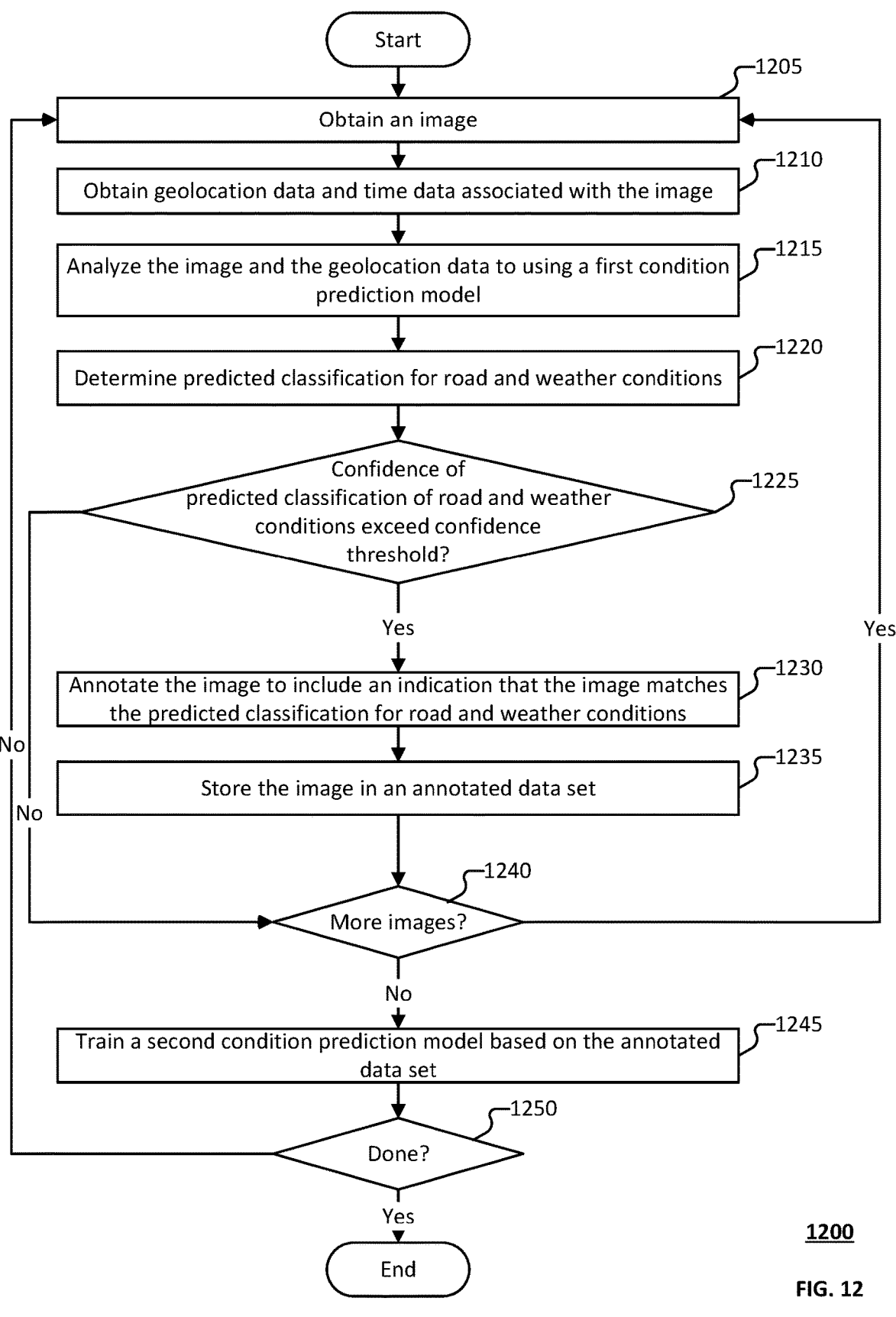
FIG. 12 a flow diagram of a method for training a condition prediction model according to various embodiments of the present application.

FIG. 12 is a flow diagram of a method for training a condition prediction model according to various embodiments of the present application. In some embodiments, process 1200 is implemented by system 100 of FIG. 1 and/or system 200 of FIG. 2. In some embodiments, process 1200 is implemented in connection with retraining/updating the condition prediction model (e.g., the first condition prediction model trained by process 1100).

At 1205, an image is obtained. The system obtains the image from a dataset of images. The dataset of images may be populated using images captured by one or more managed vehicles, or by a stream of traffic camera data.

At 1210, the system obtains geolocation data and time data that are associated with the image. In response to obtaining the image, the system determines context data pertaining to the context when the image was captured. The context data includes geolocation data and time data. As an example, the image may have associated metadata that indicates the geolocation data and time data, and in such a case, the system may obtain the context data from the metadata. As another example, the system determines the context data pertaining to an image based on an indication of the camera that captured the image. If the image was captured by a camera mounted to a managed vehicle, the system may query the geolocation data for the managed vehicle to determine the location associated with the image.

At 1215, the image and the location data are analyzed using a first condition prediction model. The system queries the first condition prediction model for a prediction of a classification for the image. In some embodiments, querying the first condition prediction model includes using the image and another type of information pertaining to the context for the image, such as unified map data (e.g., weather data, temperature data, traffic data, etc.) or context data for the managed vehicle.

At 1220, the system determines a predicted classification for road and weather conditions. The system obtains the predicted classification for road and weather conditions from the first condition model.

At 1225, the system determines whether a confidence of the predicted classification for road and weather conditions exceeds a confidence threshold. In response to receiving the predicted classification for road and weather conditions, the system compares a confidence score/level associated with the predicted classification to a confidence threshold and determines whether the confidence of the predicted classification exceeds the confidence threshold. The confidence threshold may be configurable, such as by a fleet manager, in connection with modifying the sensitivity/accuracy of the model or the retraining/updating process.

In response to determining that the confidence of the predicted classification for road and weather conditions exceeds the confidence threshold at 1225, process 1200 proceeds to 1240. Conversely, in response to determining that the confidence of the predicted classification for road and weather conditions exceeds the confidence threshold at 1225, process 1200 proceeds to 1230 at which the image is annotated to include an indication that the image matches the predicted classification for road and weather conditions. For example, the image is annotated to include an indication that the classification for road and weather conditions associated with the image is the predicted classification for road and weather conditions.

At 1235, the image is stored in an annotated data set.

At 1240, the system determines whether more images are to be analyzed. For example, the system determines whether more images are to be classified or annotated with a classification for road and weather conditions, or whether more images are to be selected for retraining/updating the condition prediction model. In response to determining that more images are to be analyzed at 1240, process returns to 1205 and process 1200 iterates over 1205-1240 until no further images are to be analyzed. In response to determining that no further images are to be analyzed at 1240, process 1200 proceeds to 1245 at which a second condition prediction model is trained based at least in part on the annotated data set. For example, the system implements a machine learning process to train the second condition prediction model. The second condition prediction model may correspond to an updated first condition prediction model. For example, training the second condition prediction model may include re-training the first condition prediction model to obtain an updated first condition prediction model.

At 1250, a determination is made as to whether process 1200 is complete. In some embodiments, process 1200 is determined to be complete in response to a determination that no further condition prediction models are to be trained or re-trained, a user has exited the system, a user indicates that process 1200 is to be paused or stopped, etc. In response to a determination that process 1200 is complete, process 1200 ends. In response to a determination that process 1200 is not complete, process 1200 returns to 1205.

Although process 1200 is described in the context of determining a second condition prediction model based on a retraining/updating the first condition prediction model, process 1200 may be similarly implemented to retrain/update a later iteration of the condition prediction model. For example, in the case of retraining/updating the second condition prediction model, the system trains a third condition prediction model using a set of images classified/annotated and selected based on the second condition prediction model. For example, the previous iteration of the condition prediction model is used as feedback to identify the set of images to use in retraining/updating the condition prediction model. In some embodiments, the system as later iterations of the condition prediction model are trained, the system raises the confidence threshold implemented in the retraining of the model. For example, the confidence threshold used in selecting images for retraining the fourth condition prediction model is smaller than the confidence threshold used in selecting images for retraining the third condition prediction model, etc.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a memory;

one or more processors configured to:

obtain an image captured by a camera mounted to a first vehicle;

obtain weather data for a location at which the image was captured, wherein the weather data is obtained from map data or based at least in part on information obtained from a third-party weather service;

determine a classification for road and weather conditions using a condition prediction model to analyze the image and the weather data, wherein the condition prediction model generates the classification based on a fused representation of the image and the weather data; and in response to determining that the classification for road and weather conditions matches a particular predefined road and weather classification, determine an active measure associated with the particular predefined road and weather classification; and cause the active measure to be performed.

2. The system of claim 1, wherein the active measure comprises providing an alert to a driver of the first vehicle.

3. The system of claim 2, wherein the alert includes a recommendation for the driver to change a speed of the first vehicle.

4. The system of claim 1, wherein the active measure includes re-routing the first vehicle.

5. The system of claim 1, wherein the active measure includes providing an alert to a fleet manager of a fleet associated with the first vehicle.

6. The system of claim 5, wherein the active measure further includes providing one or more recommended alternative routes for one or more managed vehicles of the fleet.

7. The system of claim 1, wherein the active measure is determined based at least in part on querying a mapping of types of road and weather classifications to active measures.

8. The system of claim 1, wherein the condition prediction model comprises a machine learning model.

9. The system of claim 8, wherein the condition prediction model is trained using a deep neural network.

10. The system of claim 1, wherein determining the classification for road and weather conditions comprises:

determining a confidence score; and determining the classification for the road and weather conditions based at least in part on the confidence score.

11. The system of claim 10, wherein determining the classification for the road and weather conditions based at least in part on the confidence score comprises:

determining whether the confidence score exceeds a predefined confidence threshold; and in response to determining that the confidence score exceeds the predefined confidence threshold, deeming the road and weather conditions to be the particular predefined road and weather classification.

12. The system of claim 11, wherein determining the active measure comprises:

obtaining a vehicle speed; and determining the active measure based at least in part on the vehicle speed.

13. The system of claim 12, wherein the active measure includes a recommendation to change the vehicle speed based on a percentage of the vehicle speed.

14. The system of claim 1, wherein the condition prediction model generates a prediction according to an N-class weather classification, N being a positive integer.

15. The system of claim 14, wherein:

N is equal to 3; and three classifications of the N-class weather classification include:

(i) a clear road condition, and a clear or snowy weather condition;

(ii) a wet road condition, and a rainy or snowy weather condition; and (iii) (a) any road condition and a foggy or icy weather condition; or (b) an icy or snowy road condition and a snowy weather condition.

16. The system of claim 1, wherein the condition prediction model is trained based on a sampling of a set of images captured by one or more managed vehicles.

17. The system of claim 16, wherein the sampling of the set of images is generated based on predicted classifications for images comprised in the set of images.

18. The system of claim 17, wherein the sampling of the set of images for the particular predefined road and weather classifications comprises selected image samples for which corresponding predictions correspond to the particular predefined road and weather classification by having associated confidence scores that exceed a threshold.

19. The system of claim 1, wherein:

the image is an image for a particular road;

the active measure comprises rerouting a second vehicle in response to determining, based at least in part on a planned route for the second vehicle, that the second vehicle is expected to travel along the particular road within a threshold distance of the location at which the image was captured and within a threshold period of time from when the image was captured.

20. The system of claim 1, wherein the active measure is caused to be performed only in response to determining that a confidence score associated with the classification exceeds a predefined threshold corresponding to that active measure.

21. The system of claim 1, wherein the condition prediction model is retrained based on a sampling of images selected according to predicted classifications having confidence scores that exceed a retraining threshold.

22. The system of claim 1, wherein in response to determining the classification, the active measure further comprises transmitting an alert or rerouting instruction to one or more additional vehicles of a fleet managed with the first vehicle.

23. The system of claim 1, wherein in response to determining the classification, the active measure further comprises transmitting an alert or rerouting instruction to one or more additional vehicles of a fleet managed with the first vehicle.

24. A method, comprising:

obtaining an image captured by a camera mounted to a first vehicle;

obtain weather data for a location at which the image was captured, wherein the weather data is obtained from map data or based at least in part on information obtained from a third-party weather service;

determining a classification for road and weather conditions using a condition prediction model to analyze the image and the weather data, wherein the condition prediction model generates the classification based on a fused representation of the image and the weather data; and in response to determining that the classification for road and weather conditions matches a particular predefined road and weather classification, determining an active measure associated with the particular predefined road and weather classification; and causing the active measure to be performed.

25. A computer program product embodied in a non-transitory computer readable medium and comprising computer instructions for:

obtaining an image captured by a camera mounted to a first vehicle;

obtain weather data for a location at which the image was captured, wherein the weather data is obtained from map data or based at least in part on information obtained from a third-party weather service;

determining a classification for road and weather conditions using a condition prediction model to analyze the image and the weather data, wherein the condition prediction model generates the classification based on a fused representation of the image and the weather data; and in response to determining that the classification for road and weather conditions matches a particular predefined road and weather classification, determining an active measure associated with the particular predefined road and weather classification; and causing the active measure to be performed.

* * * * *